US011456538B2

(12) United States Patent
Jamaly

(10) Patent No.: US 11,456,538 B2
(45) Date of Patent: Sep. 27, 2022

(54) METHODS AND SYSTEMS FOR PROVISIONING OF TELECOMMUNICATIONS SIGNALS IN MOVING TRAINS

(71) Applicant: Swisscom AG, Bern (CH)

(72) Inventor: Nima Jamaly, Bern (CH)

(73) Assignee: SWISSCOM AG, Bern (CH)

( * ) Notice: Subject to any disclaimer, the term of this patent is extended or adjusted under 35 U.S.C. 154(b) by 416 days.

(21) Appl. No.: 16/415,260

(22) Filed: May 17, 2019

(65) Prior Publication Data

US 2020/0021035 A1  Jan. 16, 2020

(30) Foreign Application Priority Data

May 17, 2018  (GB) ...................................... 1808058
Jan. 31, 2019  (GB) ...................................... 1901378

(51) Int. Cl.
*H01Q 15/16* (2006.01)
*F41J 2/00* (2006.01)

(52) U.S. Cl.
CPC .............. *H01Q 15/165* (2013.01); *F41J 2/00* (2013.01)

(58) Field of Classification Search
CPC ................................................... H01Q 15/165
USPC ............................... 342/5; 343/837; 398/167
See application file for complete search history.

(56) References Cited

U.S. PATENT DOCUMENTS

| 4,149,304 A | 4/1979 | Brynjegard |
| 4,551,726 A | 11/1985 | Berg |
| 4,677,440 A | 6/1987 | Edson et al. |
| 6,317,242 B1* | 11/2001 | Ozeki ................. H04B 10/801 398/164 |
| 2010/0033390 A1* | 2/2010 | Alamouti ............... H04B 7/145 343/837 |
| 2011/0045764 A1 | 2/2011 | Maruyama et al. |
| 2011/0217934 A1 | 9/2011 | Oga |
| 2013/0038433 A1 | 2/2013 | Ullrich |

FOREIGN PATENT DOCUMENTS

| CN | 1561014 A | 1/2005 |
| GB | 684300 | 12/1952 |
| GB | 1119481 A | 7/1968 |
| GB | 2575900 A | 1/2020 |
| JP | H07154320 A | 6/1995 |

(Continued)

OTHER PUBLICATIONS

Extended European Search Report for EP19174938.1, dated Sep. 23, 2019, 11 pages.

(Continued)

*Primary Examiner* — Bo Fan

(74) *Attorney, Agent, or Firm* — McAndrews, Held & Malloy, Ltd.

(57) ABSTRACT

Systems and methods are provided for provisioning of telecommunications signals in moving trains. Scattering panels may be utilized for redirecting wireless signals, such as by scattering them, to provide better communication performance on the moving trains. The scattering panels may be configured to scatter the signals, such as by reflecting them. The scattering panels may be configured for operation in conjunction with a number of antennas that communicate the signals being scattered via the scattering panels.

21 Claims, 10 Drawing Sheets

(56) References Cited

FOREIGN PATENT DOCUMENTS

| JP | 2007129420 | 5/2007 |
|---|---|---|
| SU | 964802 | 10/1982 |
| SU | 1707586 | 1/1992 |

OTHER PUBLICATIONS

Search and Examination Report for GB1901378, dated May 21, 2019. (9 pages).
British Search Report for GB1808058.0, dated Nov. 4, 2019, 5 pages.
British Examination Report GB1901378.8, dated Sep. 25, 2020, 3 pages.
Summons to attend oral proceedings for EP19174938.1, dated Jul. 16, 2021, 8 pages.

* cited by examiner

Figure 2a
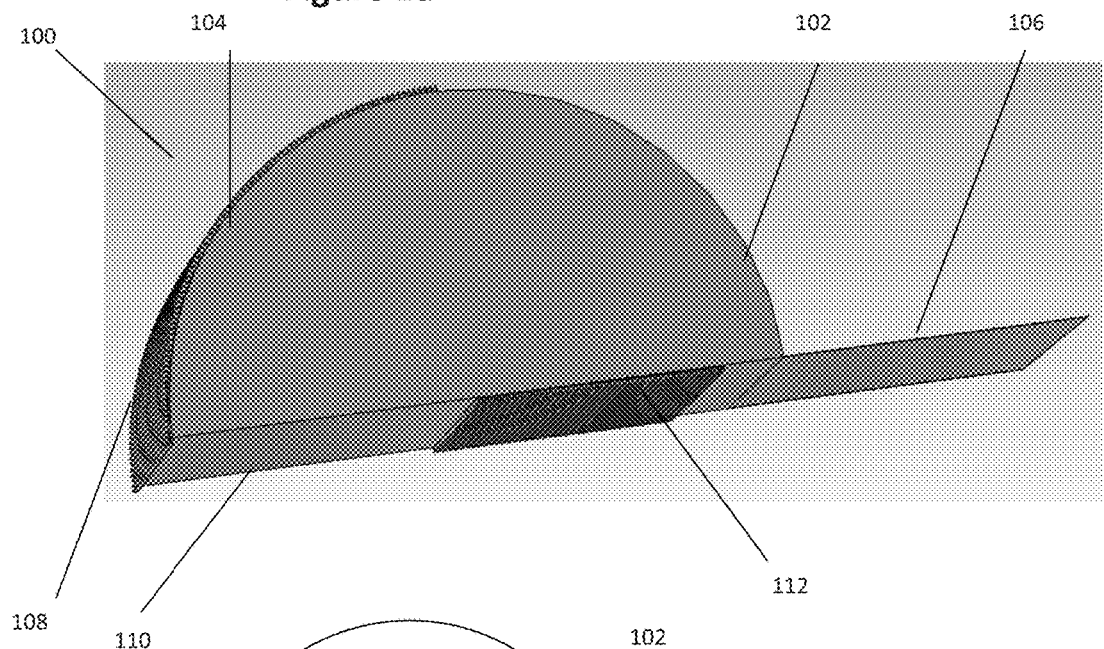
Figure 2c
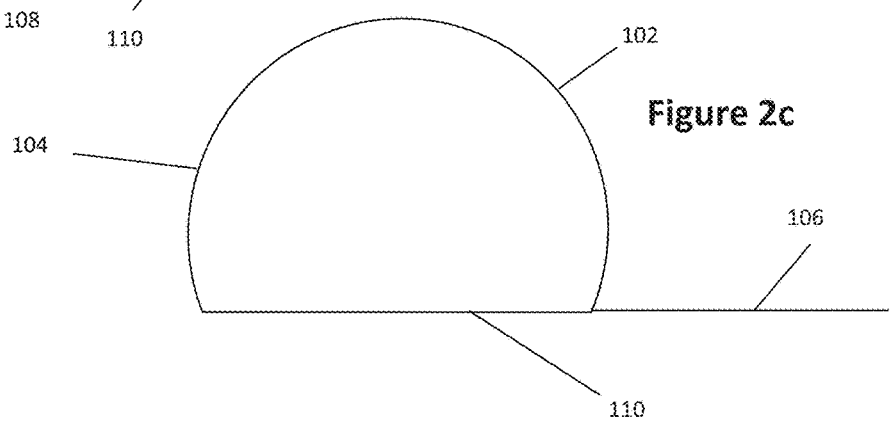
Figure 2b
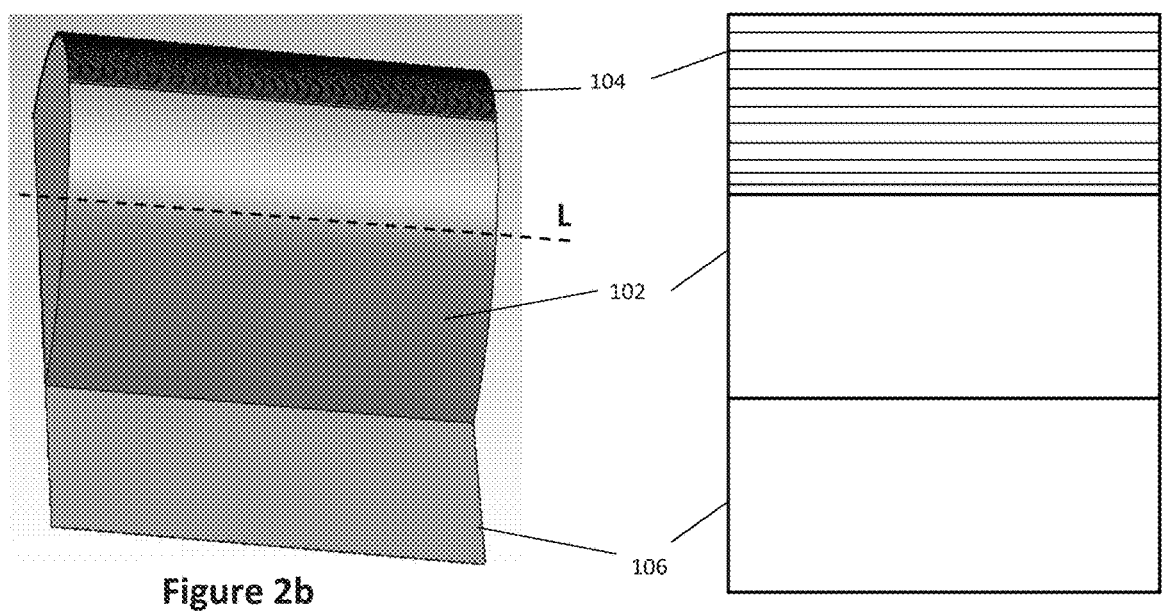
Figure 2d

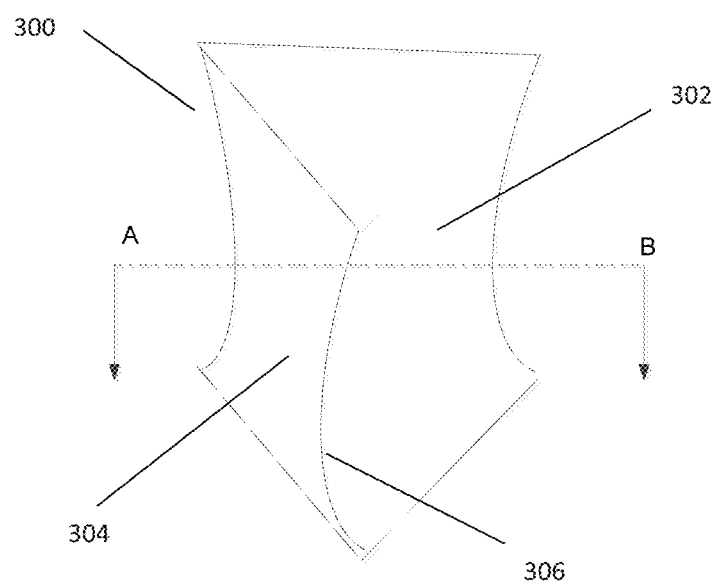
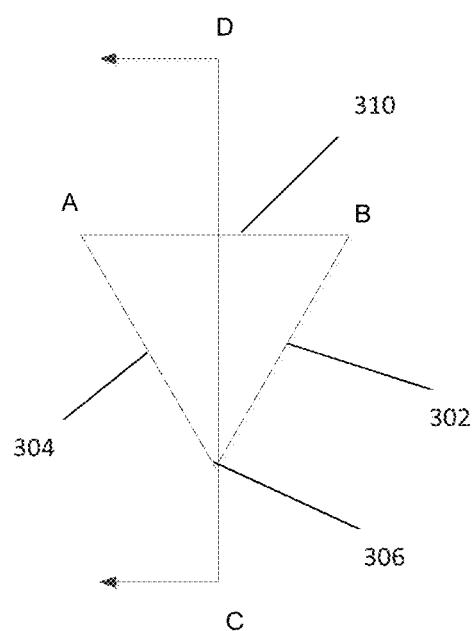
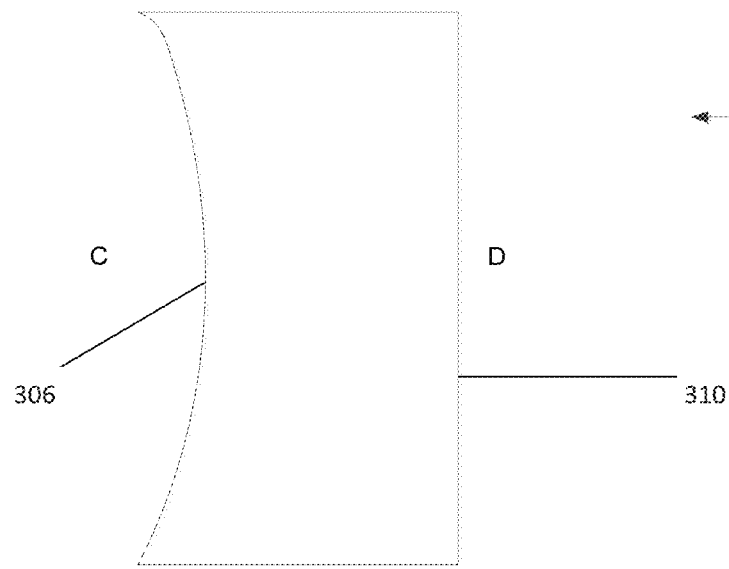

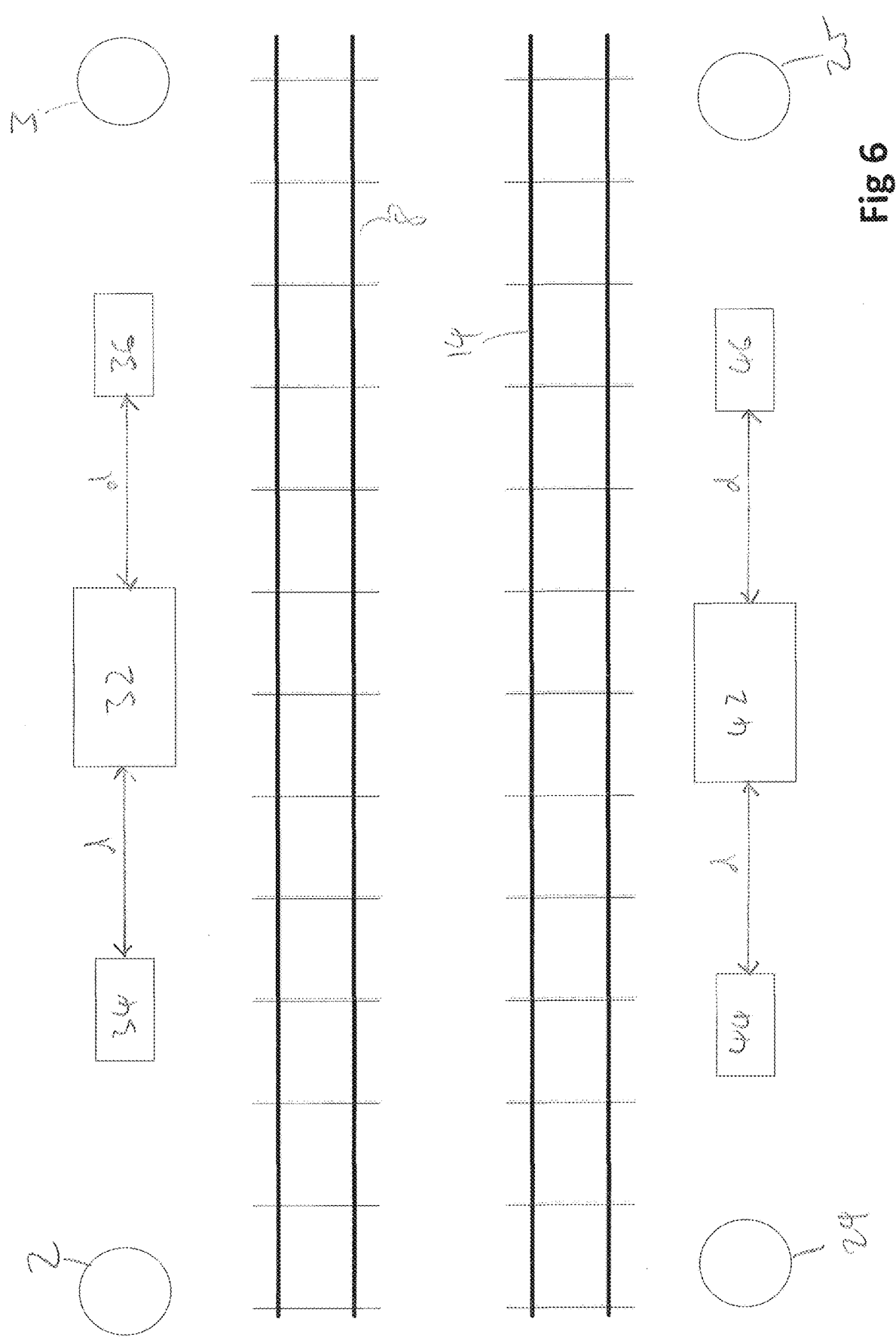

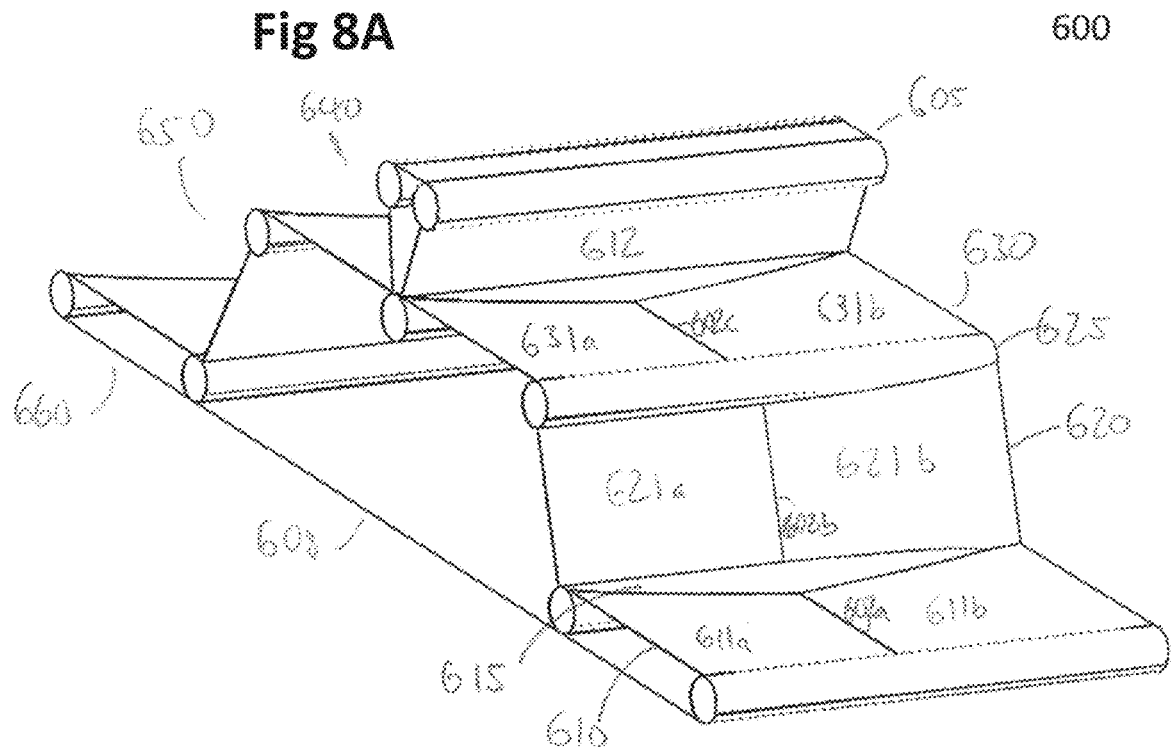
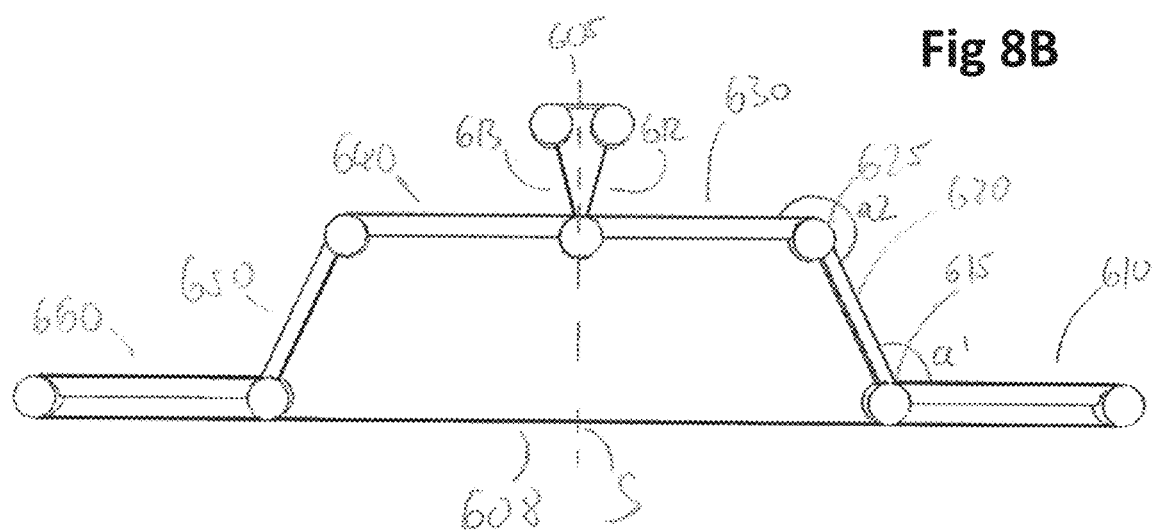

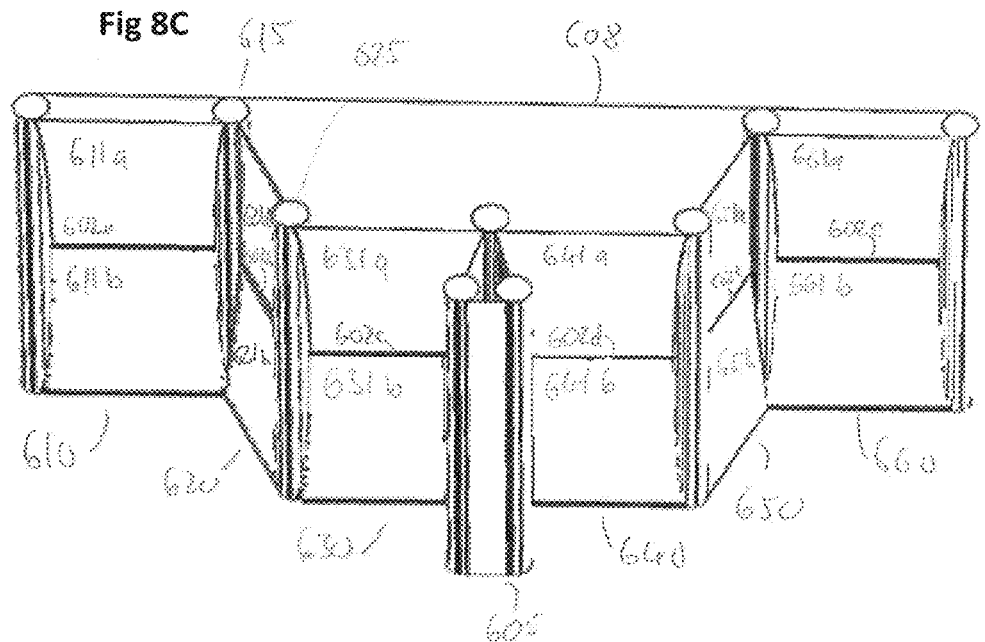

METHODS AND SYSTEMS FOR PROVISIONING OF TELECOMMUNICATIONS SIGNALS IN MOVING TRAINS

CLAIM OF PRIORITY

This patent application claims the right of priority to and from United Kingdom (GB) Patent Application No. 1808058.0, dated May 17, 2018, and United Kingdom (GB) Patent Application No. 1901378.8, dated Jan. 31, 2019. Each of the above applications is hereby incorporated herein by reference in its entirety.

BACKGROUND

The present disclosure relates to communication solutions. In particular, various embodiments in accordance with the present disclosure relate to methods and systems for provisioning of telecommunications signals in moving trains. In this regard, In this regard, conventional telecommunications solutions for communication of signals with trains, if any existed, may be costly, cumbersome and inefficient.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

Systems and/or methods are provided for provisioning of telecommunications signals in moving trains, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

Various features and advantages of the disclosure will become apparent from the following description of non-limiting exemplary embodiments, with reference to the appended drawings, in which:

FIG. 2a illustrates a first elevation view of an example scattering panel, in accordance with the present disclosure.

FIG. 2b illustrates a plan view of the example scattering panel shown in FIG. 2a.

FIG. 2c illustrates a second elevation view of the example scattering panel shown in FIG. 2a.

FIG. 2d illustrates a front view of the example scattering panel shown in FIG. 2a.

FIG. 3a illustrates another example scattering panel, in accordance with the present disclosure.

FIG. 6 illustrates another example of a telecommunications system for directing signals into a train, in accordance with the present disclosure.

FIGS. 8a-8d illustrate an example scattering panel for use in the example telecommunications system shown in FIG. 7.

DETAILED DESCRIPTION

Figure 1:
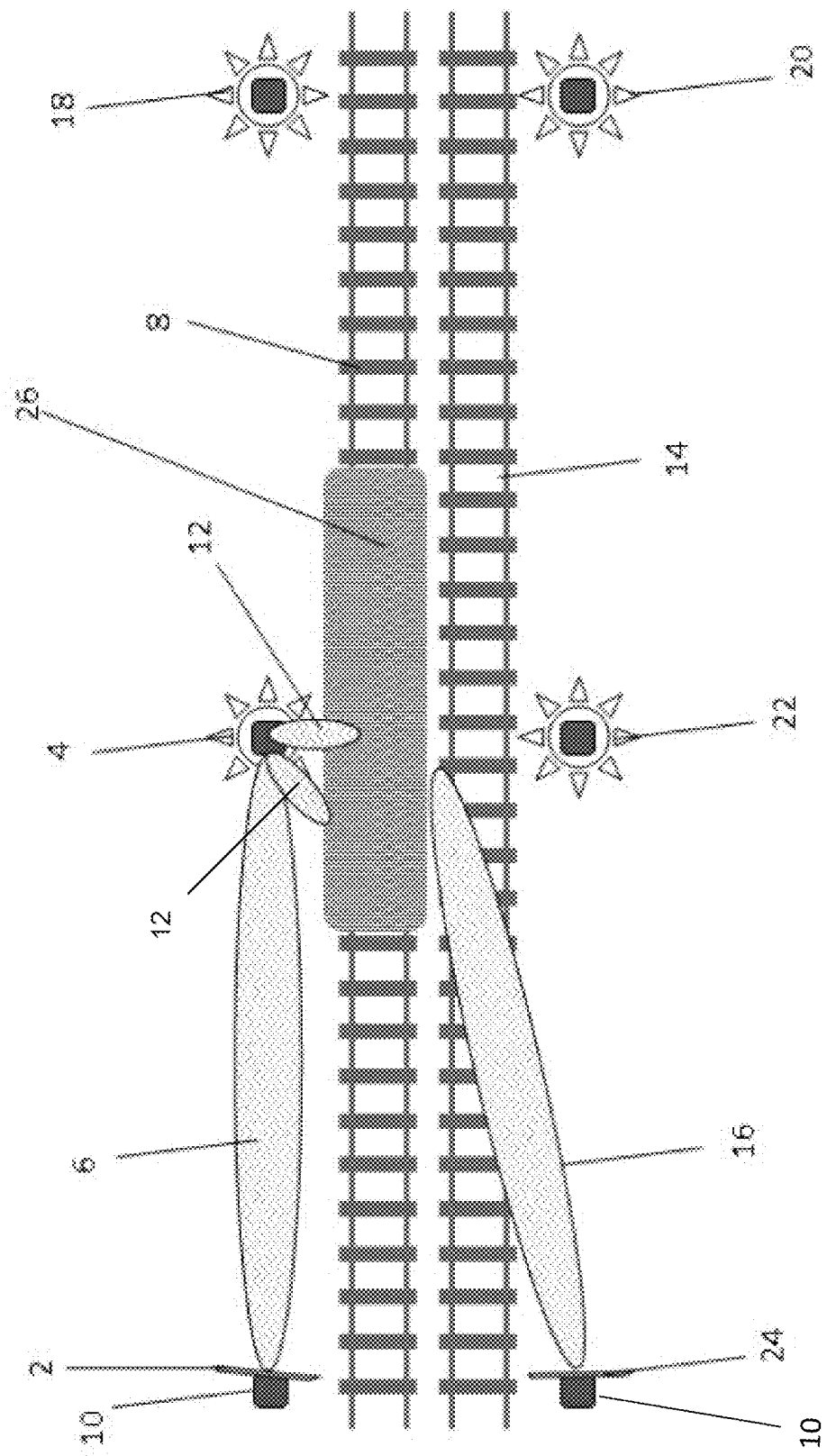
FIG. 1 illustrates an example telecommunications system for directing signals into a train, in accordance with the present disclosure.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

Example implementations in accordance with the present disclosure may be found in methods and systems for provisioning of telecommunications signals in moving trains, as described in the following in more detail with reference to the attached figures. In this regard, rail passengers may experience difficulty with telecommunications connectivity on moving trains. Existing telecommunications solutions for combat such issues have drawbacks. For example, in some existing solutions, use of a leaky feeder cable that is situated next to the rail track is proposed. Such solutions may be very costly, however, as it requires significant lengths of feeder cable to be installed, such as for the full length of the rail track to ensure full coverage. Moreover, as the leaky feeder cable is a continuous structure it may act like a wind break, and so is liable to damage from the elements. Designing a leaky feeder cable that may withstand the elements may involve the use of heavy and expensive posts. These posts are difficult to install, and may increase legal hurdles in getting permission for installation. The posts along with the leaky feeder cables may have a large visual impact to which local residents and train passengers may object.

In other existing solutions, a distributed antenna system along the track may be used, with multiple antennas and with each antenna emitting radiation in the direction of the rail track at a series of closely spaced points along that track. Such solutions may also be very costly, however, as installing antennas is expensive—e.g., as it may involve installing optical cable or another form of communication connection to connect each antenna to a backbone network. A further complication is that tunnels or other obstacles may not allow antenna installation beside the entire length of the track. There may also be the need for a great number of antennas, as the power received in a train falls rapidly as the distance from the antenna increases.

Another added complication with any possible solution is the trains themselves, as train carriages may be metal. This can limit the strength of telecommunication signals in the train. This is a particular issue if the train has windows tinted using a metal layer.

Accordingly, implementations in accordance with the present disclosure may be directed at providing improved solutions for provisioning of telecommunications signals to and/or from moving trains, in more cost-effective manner while also addressing overcoming various problems of existing solutions including those noted above. In particular, various example implementations in accordance with the present disclosure may comprise use of scattering panels for redirecting signals. The scattering panels may comprise one or more surfaces for redirecting wireless signals, by scattering the signals (e.g., by reflecting them).

An example implementation may comprise a wireless communications system comprising a communications antenna, situated beside a rail track, for sending and receiving wireless signals, and one or more scattering panel(s) situated beside the rail track and spaced apart along the rail track from the communications antenna. The scattering panels may be configured to direct the wireless signals from or to the communications antenna into or from a train on the length of rail track.

An example method for installing a scattering panel beside a rail track may comprise disposing a scattering panel beside a section of rail track spaced apart along the track from a telecommunications antenna; and selecting a position of the scattering panel so that RF electromagnetic signals incident on a first surface of the scattering panel from the antenna are directed across the track. Selecting the position of the scattering panel may comprise selecting the height based on the height of the antenna, and a vertical profile of the first surface, for example, wherein selecting the position of the scattering panel comprises selecting its orientation.

The scattering panels may be mounted on structures separate from the antennas. For example, a scattering panel may be attached to a mast, such as a catenary mast. The scattering panel and antenna may each be attached to different masts, separate from each other, such that the antenna and scattering panel may be spaced apart from one another along the rail track.

As noted above, the scattering panel may be configured for redirecting telecommunications signals. In an example implementation, the scattering panel may comprise a first surface for presenting a cross section to electromagnetic signals incident on the scattering panel from a first direction, where the first surface is shaped for redirecting the electromagnetic signals predominantly in a second direction, transverse to the first direction. The scattering panel may also comprise a second surface on a side of the scattering panel that is sheltered from the electromagnetic signals by the first surface. The first surface and the second surface may be electrically conductive and the second surface may comprises corrugation for reducing the magnitude of electromagnetic signals propagating over the second surface transverse to the direction of the corrugations.

The direction of the corrugations of the second surface of the scattering panel may be the direction of the grooves or ridges that may form the corrugations. This could be transverse to the direction of the rail track, or alternatively may be parallel to the rail track.

The scattering panel may have a rounded or triangular profile when viewed in plan. For example, its plan cross section may be triangular or round, or for example, it may be semi-circular (e.g., as in a half-cylinder). The scattering panel may comprise a cone. The back side (rear face) of the scattering panel may be flat. In use when the scattering panel is erected next to a rail track, this rear face may face away from the rail track. The scattering panel may be provided by a single laminar structure, for example a single sheet of metal.

The front face of the scattering panel, opposite to the rear face may comprise two surfaces. A first surface on one half of the face is presented to the antenna, and a second surface on the other half of the face is hidden from direct signals from the antenna by the first face.

The plan cross section of the scattering panel may be part circular, and the first surface and the second surface may be disposed on adjacent sectors of a curved face of the scattering panel. The scattering panel may comprise a flat back side that carries corrugations. The corrugations of the second surface may be orientated vertically.

As noted above, the scattering panel may comprise surfaces for redirecting wireless signals, by scattering the signals (e.g., by reflecting them). In this regard, one or more of the surfaces of the scattering panel (and the other scattering panels described herein) may be electrically conductive. For example, they may comprise metal. This may be provided by a metal layer such as a metal foil carried on a support such as a substrate, which may be lighter (less dense) than the metal. The metal layer may have a thickness and/or conductivity selected so that the first surface scatters wireless signals having a frequency below 6 GHz, for example, in the range 0.8-5.7 GHz, and more for example comprising one or more of: the 900 MHz communication band, the 1800 MHz communication band, the 2100 MHZ communication band, the 2400 MHZ communication band, the 2600 MHz communication band, the 3500 MHz communication band, or other known communication bands. The scattering panel may be hollow.

The vertical profile of the first surface may be concave (e.g., it may be concave when viewed in a vertical plane normal to its surface), while its horizontal profile may be straight or convex. Likewise, the vertical profile of the second surface may also be concave, while its horizontal profile may be straight or convex.

The concave first surface may be concave by an angle of less than 5°, for example, and its exterior angle may be, for example, between 90° and 95°. In other words, the concavity may be such that, when the scattering panel is erected, the angle between the edges of the first surface and the vertical may be less than 5°. This angle range may be used so that if a train has two floors (e.g., a double decker train) then both floors of the train are illuminated by the scattered wireless signal. An equivalent definition is the angle the first surface would take were it flat, and the line that the first surface actually takes due it being concave. When, in use, the scattering panel is erected beside a rail track, the concave nature of the first and/or second surface may assist in scattering the wireless signal from the antenna toward a region at a particular height—for example corresponding to the side of a passenger compartment of a train on the rail tracks. For example, it may direct these signals towards a window of such a train.

The scattering panels of the present disclosure, when installed beside a track, with their first surface facing towards an antenna spaced apart from the scattering panel along the track, may direct wireless signals from the antenna transverse to the track. This may increase the strength of the wireless signal inside a train on the track. In accordance with the present disclosure, "transverse" may mean that the scattered wireless signal is substantially more transverse to the rail track relative to the wireless signal incident on the scattering panel. For example, it may mean that the signal is directed perpendicular to the rail track.

As noted above, the scattering panel may comprise a second surface. The second surface may be a mirror image of the first surface and may be arranged so that when the scattering panel is erected beside a rail track, it faces away from the antenna, and may not be illuminated by the wireless signal produced by the antenna.

The second surface may comprise corrugations, which may be provided by the form of the surface itself, or by an additional corrugated structure disposed on it. The corrugations may be electrically conductive, for example they may comprise metal. Corrugations may be a series of repeating or non-repeating undulations in a surface. For example, the undulations may be sinusoidal, saw-tooth, or may comprise any series of grooves and ridges. The corrugations may be configured such that the magnitude of an alternating electromagnetic field propagating over the second surface is reduced.

The first surface may face the opposite direction to the second surface, e.g., it may be on the opposite side of the scattering panel. For example, the first surface may face towards the antenna.

In an example implementation, the scattering panel may be a semi-circular prism shape, such as a half cylinder. The first surface and second surface may comprise parts of the same single curved face of such a structure.

The scattering panel may comprise a back side, opposite to the first surface and second surface. The back side may be corrugated. This may have the effect that the magnitude of an alternating electromagnetic field propagating over the back side is at least partially reduced.

The wireless signal produced by the antenna may comprise an electromagnetic signal within a particular frequency band—e.g., in a frequency band between 800 MHz to 5.7 GHz.

The antenna may be situated beside the rail track. For example, the antenna may be situated less than 5 m away from the rail track. The wireless signal produced by the antenna may travel to the scattering panel in a direction parallel to the rail track before being reflected by the scattering panel.

The scattering of the signals may meet particular power and directional criteria. For example, directing the wireless signal to be transverse to the rail tracks means that 75% of the power of the first wireless signal incident on the scattering panel is directed to be within 45 degrees of perpendicular to the rail track.

The antenna may be configured to receive a second wireless signal from an electronic device situated on the train. The antenna and electronic device may thus provide a two way communication link.

An example method in accordance with the present disclosure of directing wireless signals into a train may comprise the steps of producing, by use of an antenna, a first wireless signal, and deflecting, by use of a scattering panel, the first wireless signal across a rail track, such that the first wireless signal is incident to the side of a train situated on the rail track. The deflection of the first wireless signal may direct the first wireless signal transverse to the rail track. In some examples the first wireless signal may be directed perpendicular to the rail track. The method may include the antenna producing the wireless signal only if the presence of a train is detected. The method may include an electronic device inside the train amplifying the first wireless signal. The electronic device may forward the amplified signal to another electronic device which was the intended recipient of the wireless signal.

In an example implementation, a scattering panel for scattering telecommunications signals, in accordance with the present disclosure, may comprise a first surface, and a second surface. The first and second surfaces may be on opposite sides of the same face of the scattering panel. The second surface may comprise corrugations. The corrugations may reduce the magnitude of any electromagnetic field propagating over the second surface.

The first surface may be concave. This may be in the vertical plane of the scattering panel. The concave first surface may be concave by an angle of less than 5 degrees. That angle may be the reflex interior angle, between the line the first surface would take if it were flat, and the line that the first surface actually takes due it being concave.

The first surface may be configured to scatter a wireless signal incident on the first surface. The scatter may include reflection, refraction and deflection of the wireless signal.

The first surface and second surface may be formed from a single curved face. The curved face may curve such that the portion comprising the first surface faces the opposite direction to the portion of the curved face comprising the second surface. Opposite in this case may mean that were one surface to face substantially in a northerly direction, the other would face substantially in a southerly direction.

The scattering panel may be in the shape of a semi-circular prism, such as a half cylinder.

The first surface may be formed of a material that is reflective to microwaves. This may mean the wireless signal is not fully absorbed by the first surface.

The scattering panel may comprise a back side. The back side may be corrugated.

The scattering panel may be configured to deflect a first wireless signal to travel perpendicular to and across a rail track.

The antenna may be configured for communicating wireless signals that comply with one or more of the Bluetooth, Wi-Fi, GSM, 3G, 4G, and/or 5G standard protocols.

In an example implementation, a scattering panel for scattering telecommunications, in accordance with the present disclosure, may comprise a first surface, where the first surface may be concave, and a second surface. The second surface may be on the opposite side of the scattering panel to the first surface. Further, the first surface and the second surface may comprise portions of the same curve. The first surface may be saddle shaped, that is, for example, it may comprise a saddle point, where the saddle point is at a minimum (the bottom of a curve) in a first plane and is at a maxima (the top of a curve) in a second plane, which may be perpendicular to the first plane. This may be because of the first curve, and the concave nature of the first surface producing a saddle shape with a saddle point on the first surface. In other words, its vertical profile may be concave while its horizontal profile may be convex.

In an example implementation, a multi-faceted scattering panel for redirecting radio frequency signals, in accordance with the present disclosure, may comprise a plurality of facets, with each facing in a different direction to at least one other facet of the scattering panel, and with each facet comprising a conductive planar surface of one of a plurality of sheet-like members of the scattering panel. The sheet-like members are coupled to one another along their edges such that the facets together combine to provide a set of adjacent concave reflectors. For example, the scattering panel may be configured to reflect telecommunications signals across a railway track.

The scattering panel may be installed next to the railway track and enable incident telecommunication signal beams from an antenna to be reflected onto the track. More specifically, the scattering panel may enable a reflected beam to be focused in a vertical direction, while being spread along a length of the track. As such, this may increase the proportion of signal that is successfully transmitted to a train on the track. Such scattering panels may be employed in the telecommunications systems and antenna corridors described herein.

The set of adjacent concave reflectors may comprise a first concave reflector and a second concave reflector, where the first concave reflector is connected to the second concave reflector along a first intersection, along which facets of the first and second reflectors meet at an angle greater than 90 degrees, and for example less than 180 degrees. For example, the external surfaces of the corresponding sheet-like elements may meet at an angle greater than 90 degrees. The angle between the first and second reflectors may vary along the length of the length of the intersection. For example, the outer edges of the facets of the first and second reflectors may meet at an angle which may be less than the angle at which the facets meet towards the center of the reflectors.

The second reflector may be connected to a third concave reflector along a second intersection along which the facets of the second and third reflectors meet at an angle greater than 180 degrees at the second intersection. For example, the external surfaces of the corresponding sheet-like elements may meet at an angle greater than 180 degrees. The angle between the second and third reflectors may vary along the length of the length of the intersection. For example, the outer edges of the facets of the second and third reflectors may meet at an angle which may be greater than the angle at which the facets meet towards the center of the reflectors.

The first reflector may be connected to the opposite edge of the second reflector from the third reflector.

The facets of the first reflector that are adjacent to the first intersection may extend from the first intersection in a direction that is opposite and parallel to corresponding facets of the third reflector adjacent to the second intersection. For example, the first and third reflectors may each comprise a pair of facets, and each facet of the first reflector may be arranged parallel to a corresponding one of the facets of the third reflector.

The scattering panel may further comprise an additional reflector coupled to the third reflector, with the additional reflector comprising a first face arranged to reflect radio frequency signals towards the third reflector.

The additional reflector may be shaped as an inverted triangular prism. For example, the additional reflector may have a substantially triangular cross section. For example, the additional reflector may comprise three connected sheet-like members, which may meet at curved edges such that the additional reflector is substantially triangular prism shaped. For example, the additional reflector may be symmetrical, for example it may have a cross section that is an isosceles triangle.

The scattering panel may comprise a plane of symmetry along the length of the additional reflector.

One or both of the first and second intersections may comprise a curved surface.

Each concave reflector may comprise two facets provided by two sheet-like elements connected to one another along an edge perpendicular to the first and second intersections.

The two sheet-like elements of each concave reflector may be connected to one another at an angle of less than 180 degrees.

The scattering panel may be arranged to reflect signals received from a first direction into a second direction transverse to the first direction.

The scattering panel may be arranged to reflect signals received from a third direction parallel to the first direction, into a fourth direction transverse to the third direction.

In an example implementation, a scattering panel, in accordance with the present disclosure, may comprise a trapezoidal prism, a pair of plate-like fins, and an inverted triangular prism. The trapezoidal prism comprises a base, a front face, and a pair of side faces, where each side face connects an edge of the base to an edge of the front face. The pair of plate-like fins comprises a front face and a back face, with the fins extending from either side of, and are parallel to, the base of the trapezoidal prism. An apex edge of the triangular prism is connected along its length to the center of the front face of the trapezoidal prism to divide the front face into a first side and a second side, where the first and second sides of the front face of the trapezoidal prism, the side faces of the trapezoidal prism, and the front faces of the plate-like fins each comprise electrically conductive facets for reflecting radio frequency signals. For example, the facets may be formed on the outward facing external surfaces of the scattering panel. The base of this trapezoidal prism may provide the rear face of the scattering panel, that is, for example, it may face away from the train tracks when the scattering panel is installed adjacent the train tracks.

Each of the trapezoidal prism, the side faces of the trapezoidal prism, and the front faces of the plate-like fins may comprise a pair facets.

Each pair of facets may comprise a first facet connected to a second facet of the pair along an edge, at an angle less than 180 degrees.

Each of the side faces of the trapezoid prism may be connected to the front face along an intersection for example comprising curved ridge.

The side faces of the trapezoidal prism may be each connected to a corresponding one of the plate like fins, such as, for example, along an intersection.

The inverted triangular prism and the trapezoidal prism may be aligned such that the scattering panel comprises a plane of symmetry about the center of the inverted triangular prism and the trapezoidal prism.

The inverted triangular prism is optional, as is the base (rearward facing surface) of this scattering panel.

In an example implementation, an antenna corridor may be implemented for a length of a rail track, comprising any of the scattering panels described or claimed herein. Such an antenna corridor may thus provide a system, or systems, as described below with reference to FIG. 1 for example.

An example method of assembling a telecommunications system, in accordance with the present disclosure, may comprise disposing a scattering panel beside a section of rail track. The scattering panel may be any of the scattering panels described in the present disclosure and/or may include any features described in conjunction therewith. The telecommunications system may be any of telecommunications systems described in the present disclosure.

An example system for providing a connection between an electronic device situated on a train and a network, in accordance with the present disclosure, may comprise a section of rail track configured for a train to travel thereon in a first direction, and an antenna situated beside the rail track, configured to enable the wireless connection between the electronic device and the network, by being configured to produce a first wireless signal. The system may also include a scattering panel situated beside the rail track, such that the first wireless signal travels parallel to the rail track in the first direction between the antenna and the scattering panel. The scattering panel may deflect the first wireless signal produced by the antenna, across the rail track in a direction perpendicular to the first direction, such that when a train travels on the section of rail track the wireless signal is incident the side of the train, to enable transmission of the wireless signal into the inside of the train. The deflecting member may comprise a scattering panel.

An example communication method for providing a communication service in a passenger train, in accordance with the present disclosure, may comprise directing a wireless signal at a redirecting panel positioned along a rail track and the panel redirecting the wireless signal transverse to the rail track, such that if a train is positioned on the rail track adjacent the redirecting panel, the redirected wireless signal at least partially penetrates the train to provide a wireless signal for a communication service within the train.

An example wireless communications system, in accordance with the present disclosure, may comprise a communications antenna, situated beside a rail track, for sending wireless signals, and a scattering panel situated beside the rail track and spaced apart along the rail track from the communications antenna. The scattering panel may be configured to direct the wireless signals from the communications antenna across the length of rail track.

An example antenna corridor, in accordance with the present disclosure, may comprise a series of antennas disposed in a line which may run parallel with a length of rail track, and may comprise at least one scattering panel. The antennas may be configured to emit wireless signals at least partially in a direction parallel to the rail track. The scattering panel may be configured to at least partially deflect a portion of the wireless signal across the rail track.

FIG. 1 illustrates an example telecommunications system for directing signals into a train, in accordance with the present disclosure. Shown in FIG. 1 are two parallel lengths of rail track 8, 14 for trains, such as train 26 to travel along.

The system may be configured for directing signals (e.g., electromagnetic signals) into moving trains, such as the train 26 as it travels along track 8 or 14. For example, as shown in FIG. 1, the system comprises a first antenna 2, and a second antenna 24. It also comprises a first scattering panel 4, a second scattering panel 18, a third scattering panel 20, and a fourth scattering panel 22.

The first antenna 2 is situated on a mast 10 and is disposed on a first side of the two tracks 8, 14, as is the first scattering panel 4, and the second scattering panel 18. The second antenna 24 is also situated on a mast 10 and disposed on the other side of the tracks 8, 14 as are the third and fourth scattering panels.

The scattering panels 4, 18, 20, 22 and the antennas 2, 24 are situated beside the rail tracks, and spaced from the rail tracks, for example by a distance of between about 0.5 meters and about 10 meters, for example between 1 meter and 5 meters, and for example between 2 meters and 4 meters; or for example between 1 meter and 3 meters, or between 3 meters and 6 meters.

For illustrative purposes, a first lobe 6 of wireless signal is shown emanating from the first antenna 2 and being directed on to the first scattering panel 4. In addition, a second lobe 16 of wireless signal is shown emanating from the second antenna 24 and being directed across the tracks 8, 14 on to the first scattering panel 4. Two lobes of scattered signals 12 are also shown emanating from the first scattering panel 4. It should be appreciated that each lobe 6, 16 shown in FIG. 1 is merely illustrative of an example wireless signal.

The scattering panels 4, 18, 20, 22 are typically spaced apart from the antennas 2, 24 (e.g., by two meters or more) along the tracks 8, 14. The first scattering panel 4 is positioned between the first antenna 2 and the second scattering panel 18. The first scattering panel 4 is spaced from the first antenna 2 along the tracks, the spacing between the first antenna 2 and the first scattering panel 4 may be between 2 meters and 1000 meters, for example between 600 meters and 800 meters.

On the other side of the tracks, the fourth scattering panel 22 is positioned between the second antenna 24 and the third scattering panel 20. The third scattering panel 20 is spaced from the second antenna 24 along the tracks, the spacing between the second antenna 24 and the fourth scattering panel 22 may be between 2 meters and 1000 meters, for example between 600 meters and 800 meters. The distance along the tracks between the third scattering panel 20 and the fourth scattering panel 22 may be similar to that between the second antenna 24 and the fourth scattering panel 22.

The antennas 2, 24 may be arranged on different sides of the tracks 8, 14 at a particular location along the tracks 8, 14. This may enable the two antennas 8, 14 to be fed by the same power and/or communications cables (not shown in FIG. 1).

FIG. 1 is a plan view, so the relative height of the various elements is not apparent from the drawing. However, typically the communications antennas 2, 24 may be disposed at a height of, for example, in the 5 meters to 20 meters range, and more specifically, for example, in the range of 6 meters to 10 meters above the level of the tracks. The scattering panels 4, 18, 20, 22 may have a vertical extent of more than 1 meter, and they may be less than about 5 meters high. For example, when installed beside the tracks, 8, 14, the scattering panels may be any height up to the height of the train (e.g., up to 5 meters for a double decker train), such that the antenna 2, 24 may direct signals onto the scattering panels for scattering.

The scattering panels 4, 18, 20, 22, of FIG. 1 each comprise an electrically conductive surface which is positioned to direct at least a part of an incident wireless signal (such as that illustrated by lobes 6, 16) produced by an adjacent antenna 2, 24 into a train 26 on the rail track 8 and/or 14. This electrically conductive surface (referred to as a first surface 102 in FIG. 2, below) is shaped and positioned so that it is/extends at approximately a right angle when viewed from the antenna 2, 24, and when viewed in plan, for example the first surface may extend towards the tracks 8, 14. For example, the scattering panel may have a semicircular shape when viewed in plan. The first surface 102 is shaped to direct wireless signals as illustrated by lobes 6, 16 incident on the scattering panel 4 from the antennas 2, 24 predominantly across the rail tracks 8, 14, for example approximately toward a train 26.

FIG. 2a illustrates a first elevation view of an example scattering panel, in accordance with the present disclosure. Shown in FIG. 2a is a scattering panel 100. In this regard, illustrated in FIG. 2a is an elevation view of the scattering panel 100, which may correspond to one or more of the scattering panels described with reference to FIG. 1, for example scattering panels 4, 18, 20, 22. The scattering panel 100 may be employed in the system shown in FIG. 1.

The scattering panel 100 illustrated in FIG. 2a is a half-cylinder (e.g., a semi-circular prism) having a curved face comprising a first surface 102 and a second surface 104, a flat back side 110 (rear face), and a laminar structure 106. The external surfaces 102, 104, 110 of the scattering panel 100 may comprise a conductive material such as metal. The second surface 104 may comprise corrugations 108, and the back side 110 may comprise corrugations 112.

In this regard, as noted above, the antenna 2, 24 and the scattering panels 4, 18, 20, 22 may be spaced apart from each other in a first direction (e.g., along the direction of the rail tracks 8, 14, by a selected distance—e.g., 2 meters or more). The first surface 102 of the panel may be shaped and positioned so that wireless signal lobes 6, 16 from the antenna 2, 24, are predominantly directed in a second direction, transverse to the first direction, for example so that they are scattered from the panel 4, 18, 20, 22 across the rail tracks 8, 14, as illustrated by the scattered signals 12. A second external surface 104 of the scattering panel 4, 18, 20, 22 may be behind the first surface 102 when viewed from the antenna 2, 24 but may still face towards the rail tracks 8, 14. It may thus be out of a line of sight from wireless signal 6 by the first surface 102.

Using electrically conductive material in a corrugated form 108 on the second surface 104 may improve the performance of the scattering panel 4, 18, 20, 22 in directing energy from the antenna 2, 24 across the tracks 8, 14. For example, such corrugations 108 may reduce the ease with which signals (e.g., electromagnetic signals) propagate over the second surface 104. The corrugations 108 may be aligned so that, when a scattering panel 4, 18, 20, 22 is erected beside the rail tracks 8, 14, the corrugations 108 are aligned transverse to the direction of separation of the scattering panel from an adjacent antenna (e.g., vertically).

The scattering panels 4, 18, 20, 22 each comprise such a first surface 102 which faces an adjacent antenna so that it can be illuminated by a wireless signal 6, 16 produced by the adjacent one of the antennas 2, 24 to scatter the wireless signal 6, 16. The horizontal (e.g., plan) cross section of the panels 4, 18, 20 22 may be convex (e.g., they may be bowed outward towards the tracks 8, 12), and (although not shown) the vertical profile of the first surface 102 of these panels 4, 18, 20, 22 may be concave, as may that of the second surface 104. For example the first surface 102 and the second surface 104 may be substantially saddle-shaped.

The plan cross section of the scattering panel 100 may be semi-circular with the laminar structure 106 providing a flat extension from one side of the back of that semicircle. The curved face of the scattering panel 100 comprises two angularly adjacent sectors: a first surface 102 and a second surface 104. As shown in FIGS. 2a, 2b, 2c, 2d, the two surfaces 102, 104 are each provided by a different sector of the half cylinder (such as two exemplary 90° sectors of its curvature). Each of these two surfaces 102, 104 may span the entire height of the panel 100.

FIG. 2b illustrates a plan view of the example scattering panel shown in FIG. 2a. In this regard, shown in FIG. 2b is a plan view of the scattering panel 100 illustrated in FIG. 2a.

FIG. 2c illustrates a second elevation view of the example scattering panel shown in FIG. 2a. In this regard, as shown in FIG. 2c, the vertical profile of the curved face of the panel 100 is flat, but it may also be concave, as described above. The vertical profile referred to herein may relate to a profile both perpendicular to any radius of curvature of this semicircle and perpendicular to any tangent to it (e.g., along a line perpendicular to the plane of the semi-circular cross-section, an example of which is shown in FIG. 2b as line L). The radius of curvature of the semi-circular plan view of the scattering panel 100 may be for example 0.5 meters to 1 meter.

However, although the scattering panel 100 may be a half cylinder, this need not be a circular cylinder. For example, the half-cylinder may be half of an ellipse, or simply curved, e.g., as an aerofoil.

The laminar structure 106 may comprise a flat sheet. It may extend from the edge of the first surface 102 (e.g., where the flat back side 110 joins the curved face 102, 104 of the half cylinder). This laminar structure 106 may be aligned with (e.g., it may lie in the same plane as) the flat back side 110.

The first surface 102 may be smooth. The second surface 104 may carry corrugations 108. As shown in FIG. 2a, these corrugations 108 may cover all of the second surface 104. This may be straight, and vertical, for example aligned with the vertical profile. The back side 110 of the panel 100 may also carry corrugations 112. The corrugations 112 on the back side 110 of the panel 100 may be provided in a region of the back side 110 which lies behind the first surface 102, and a region of the back side 110 which lies behind the second surface 104 may be flat (e.g., smooth, for example free of such corrugations 112). The corrugations 112 on the back side 110 of the panel 100 are aligned transverse to the direction of separation of the scattering panel from an adjacent antenna (e.g., vertically).

The corrugations 108, 112 comprise a series of grooves and ridges in a conductive material, such that an undulating surface may reduce the magnitude of RF electromagnetic field propagating over the second surface 104 (this may be dependent on the direction of the electromagnetic field), and may also radiate out (away from the track 8, 14) over back side 110. The grooves and ridges may have a curved or angular profile, for example they may be sinusoidal, square or saw tooth. The corrugations 108, 112 may also be shaped irregularly, without obvious structural pattern. The corrugations 108, 112, may comprise conductive material such as metal.

The corrugations 108, 112, may either be disposed upon the surface 104, 110 of the panel 100 which carries them (e.g., an additional corrugated member may be fixed to the surface), or the surface 104, 110 itself may be corrugated, that is, for example the corrugations 108, 112, may be formed by cutting into the second surface 104. For example, the corrugations 108, 112, may be provided by grooves cut into the surface. The corrugations 108, 112, may be spaced apart by a determined pitch. The pitch is the distance between adjacent ridges or adjacent grooves of the corrugation 108, 112, where applicable.

For example, the pitch may be a quarter of the wavelength of the electromagnetic radiation emitted by the antenna. As shown in FIG. 2a, the corrugations 108, 112 may comprise vertical stripes along the second surface 104, for example the stripes may be parallel with the join between the back side 110 and the second surface 104 (as shown in FIG. 2a). It is possible that instead of corrugations 108, 112 you could use an array of spikes, or pimples.

The use of the corrugations 108, 112 may assist in avoiding forward-scattering (i.e., scattering incident electromagnetic waves in the opposite direction to the direction of propagation of waves originating from the antenna 2).

Corrugations 108, 112 may scatter the electromagnetic waves which are incident on them, for example in an oblique direction relative to the direction of the corrugations 108, 112. However, for tangential incident EM waves, dependent on their stripe direction, they can stop or allow the propagation of the EM waves. In the example shown in FIG. 2a, plane waves from the antenna 2 incident on the panel 100 may be allowed to propagate, whereas other waves incident on the scattering panel 100 from elsewhere may be stopped by the corrugations 108, 112.

FIG. 2d illustrates a front view of the example scattering panel shown in FIG. 2a. In this regard, when viewed from the front of the panel 100, as shown in FIG. 2d, the first surface 102 is disposed between the laminar structure 106 and the second surface 104. The scattering panel 100 illustrated in FIG. 2a, 2b, 2c, 2d is installed beside a rail track 8, 14, the front 102, 104 of this half cylinder may face towards the rail track 8, 14, and the back side 110 may face away from it. The panel may be positioned so that the first surface 102 is on the side of the panel 100 which faces the track 8, 14 and which is nearest to the antenna 2. If a laminar structure 106 is included, this may extend from the side of the first surface 102 that is nearest to the antenna 2.

In this configuration, the laminar structure 106 may direct wireless signals 6, 16 incident upon it from such an antenna 2 onto the first surface 102. The first surface 102 can then direct these and other wireless signals 6,16 incident upon it from the antenna 2 across the rail tracks 8, 14, as illustrated with lobes 12, for providing communication in a train 26 travelling on the tracks 8, 14.

Although its horizontal profile (e.g., its plan cross section) is curved, the vertical profile of the first surface 102 may be flat or concave. For example, the scattering panel 100 may have a greater radius of curvature at its upper and lower edges than around its middle. For example, although its back is flat it may have a narrow waist such as in a 'half-hourglass' shape (e.g., an hour-glass shape halved along its longitudinal axis). The vertical profile of the first surface 102 of the scattering panel 100 may be concave, flat or convex as will be discussed with reference to FIG. 3b and FIG. 3c.

The scattering panels 100 of the present disclosure may take a variety of different shapes.

FIG. 3a illustrates another example scattering panel, in accordance with the present disclosure. Shown in FIG. 3a are three views of an example scattering panel 300: an elevation view, a plan cross section from the line indicated A-B in the elevation view (this is taken the waist in the middle of the scattering panel), and a vertical cross section from the line indicated C-D in the plan section view.

The scattering panel 300 of FIG. 3a has a different shape compared to the scattering panel 100 shown in FIG. 2a. The scattering panel 300 illustrated in FIG. 3a has a first surface 302, a second surface 304 and a back side 310. The plan cross section of this scattering panel is triangular as indicated in the plan section A-B. The first surface 302 and the second surface 304 however have a vertical profile which is concave. For example, the plan section of the scattering panel 300 may be larger at the top and bottom of the panel 300 than near its middle.

The apex edge 306 between the first surface 302 and the second surface 304 is shown as a single line, but this is merely schematic and non-limiting. Certain deviations from a perfectly triangular plan cross section and/or certain variations in the vertical section may be provided, for example the 'apex edge' of the plan section may be truncated or otherwise curved.

FIG. 3a shows just one example of a panel 300. Such panels may have a variety of plan cross sectional shapes.

Figure 3B:
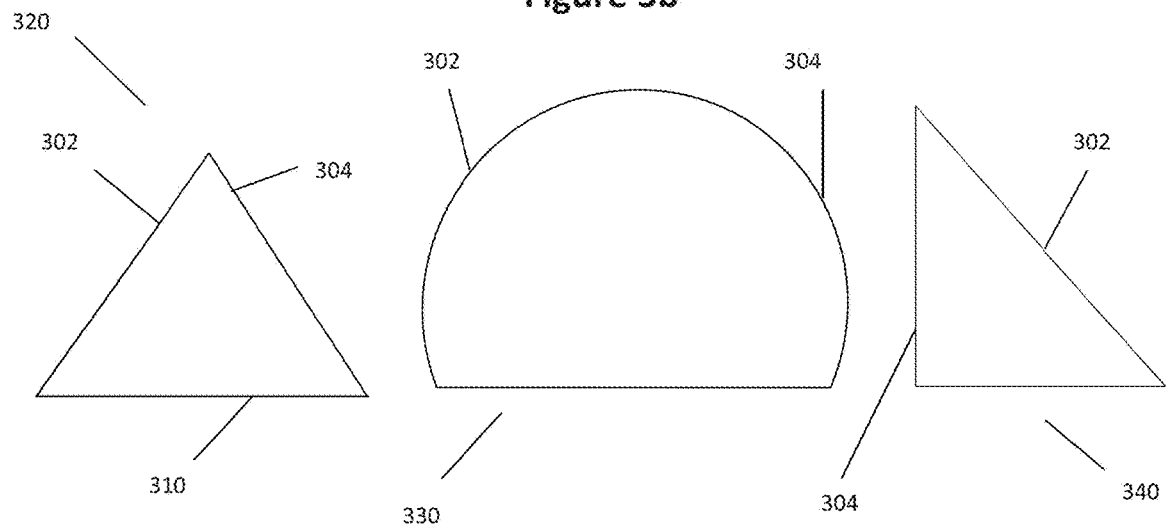
FIG. 3b illustrates three exemplary plan cross sectional shapes of an example scattering panel, in accordance with the present disclosure.

FIG. 3b illustrates three exemplary plan cross sectional shapes of an example scattering panel, in accordance with the present disclosure. Shown in FIG. 3b is the scattering panel 300 described with reference to FIG. 3a. In this regard, as illustrated in FIG. 3b, the plan cross section 320 may be triangular, for example an isosceles triangle. Where the plan section is triangular, the apices may be rounded or flattened. As also illustrated in FIG. 3b, the plan cross section may be a semi-circle 330 (as also shown in FIGS. 2a to 2d). For example, the triangular plan cross section shape of the panel shown in FIG. 3a may instead be semi-circular and the first 302 and second surface 304 of such a panel may have a concave vertical profile as explained with reference to FIG. 3a and/or FIG. 3c—such as the vertical profile 350, or the vertical profile 360.

As shown in FIG. 3b, where a triangular plan cross section is used, it need not be an isosceles triangle 320 for example it could be a right angle triangle 340 in which the first surface 302 is to be disposed at an oblique angle to the tracks 8, 14, and the second surface 304 is to be perpendicular to them. Other cross sectional shapes may be used.

Figure 3C:
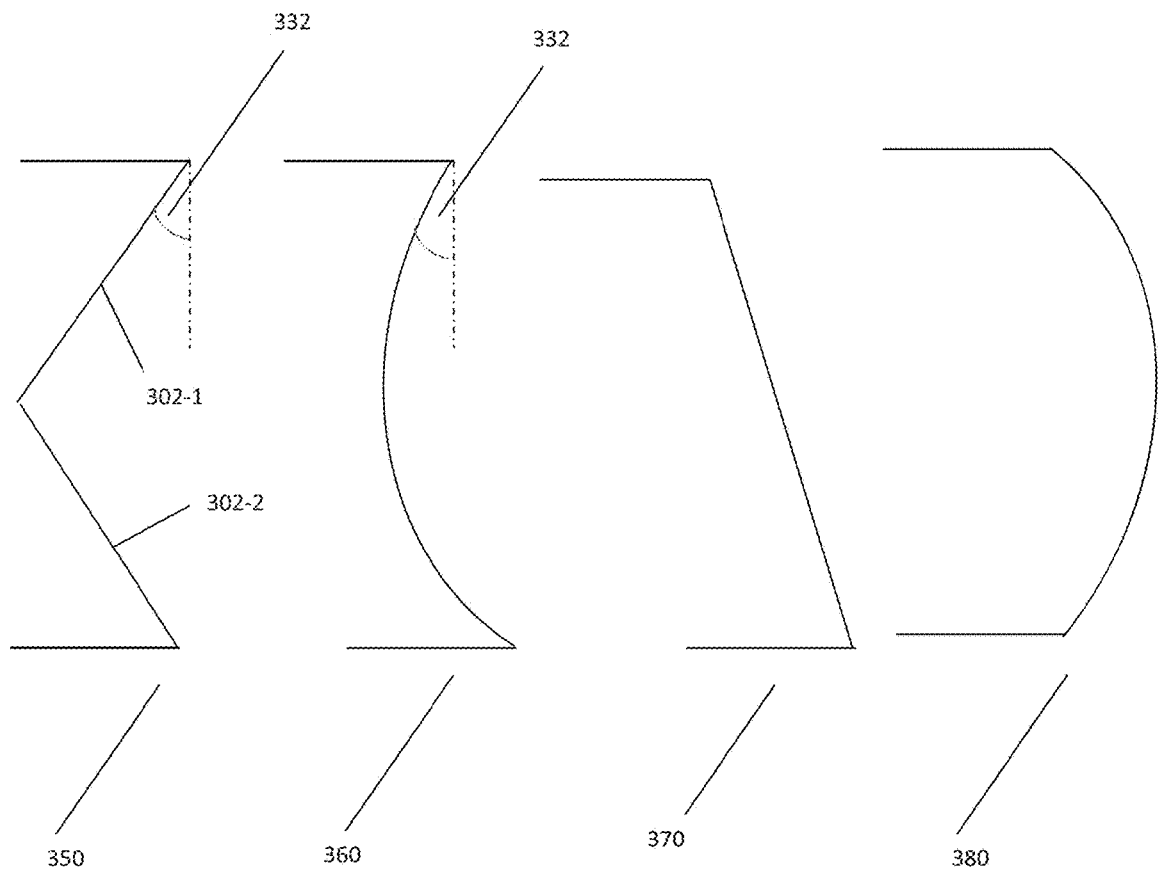
FIG. 3c illustrates three exemplary vertical profile shapes for a first surface of an example scattering panel, in accordance with the present disclosure.

FIG. 3c illustrates three exemplary vertical profile shapes for a first surface of an example scattering panel, in accordance with the present disclosure. Shown in FIG. 3c is the scattering panel 300 described with reference to FIG. 3a. In this regard, shown in FIG. 3c are exemplary vertical profiles which may be used for the first surface 302, indicated by the section C-D in FIG. 3a.

For example, the first surface 302 may comprise two flat planar surfaces, including a first surface 302-1, and a second surface 302-2, arranged to provide a concave polygonal panel 350. For example the panel 350 may taper linearly inward from its top and bottom to a narrow waist in the middle of the panel so that the vertical profile may be concave, but angular, as indicated in the left hand diagram 350 in FIG. 3c.

Such a structure may have more than two flat planar surfaces joined together to provide a concave structure. The angle of this concavity, for example the angle 332 between the vertical and the first surface 302 at the top and bottom of the panel 300 may be less than five degrees (it should be appreciated that the drawings are not to scale). As an alternative, the first surface 302 may comprise a single flat planar surface 370 which may be at an angle to the horizontal so that the vertical profile of the panel tapers inward, either from a narrow base to a wider top, or from a narrow top to a wider base. In addition, the vertical profile of the first surface 302 of the panel 300 may be convex as indicated in the right hand diagram 380 in FIG. 3c.

Each of these possible plan cross sections and vertical profiles may be used in combination in different forms of scattering panel 300. For example, the panel 300 may have a semi-circular plan cross section as, e.g., in FIG. 2a, and a curved concave vertical cross section as in, e.g., FIG. 3a. In this configuration, the first surface 304 may thus be saddle shaped. As another example, the plan cross section may be semi-circular, while the vertical profile is a concave polygon. Such a form may be provided where the upper half of the first surface 304 corresponds to the form of an inverted conical frustum, and the lower half of the first surface 304 is the mirror image of that so that the plan section of the panel 300 is part circular but the waist of the panel 300 is narrower than its top or bottom.

Figure 4A:
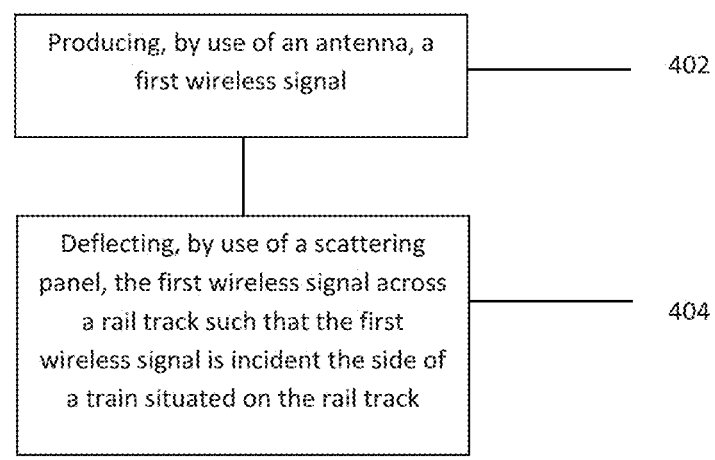
FIG. 4a illustrates a flow chart illustrating one example of a method of directing a wireless signal into a train.

FIG. 4a illustrates a flow chart illustrating one example of a method of directing a wireless signal into a train. The method comprises producing 402 by use of an antenna a first wireless signal. The method then comprises deflecting 404, by use of a scattering panel, the first wireless signal across a rail track such that the first wireless signal is incident the side of a train situated on the rail track.

The antenna of the method is an antenna 2, 24 as shown in FIG. 1, for example. The scattering panel of the method is a scattering panel 4, 18, 20, 22, 100 as shown in FIG. 1, or FIGS. 2a-d, for example. The wireless signal of the method may be illustrated by lobes 6, 16 across the rail tracks 8,14 in FIG. 1, for example.

The deflection of the first wireless signal 6,16 may direct the first wireless signal 6,16 perpendicular to a rail track 8, 14, as illustrated by lobes 12 in FIG. 1, for example.

The train windows may be composed of a glass and this may cause a large loss of power transmitted and/or received at acute angles between the incident radio signal and the glass. For example, some glass types may allow almost no electromagnetic radiation through that is incident on the window between 88-90 degrees from the normal of the window. Thus, as the window is further from an antenna 2 (and so that the angle of incidence gets closer to 90 degrees) there is more power loss, and less power may be receivable in the train 26. The use of a scattering panel such as the scattering panels 4, 18, 20, 22, 100, 300 in the system described above, and according the method described above, may partially compensate for this reduction in power. The glass may be a type of glass that only allows one polarization of electromagnetic radiation to pass through.

Figure 4B:
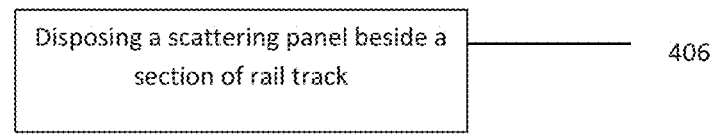
FIG. 4b illustrates a flow chart illustrating one example of a method of assembling a telecommunications system.

FIG. 4b illustrates a flow chart illustrating one example of a method of assembling a telecommunications system. The method comprises disposing 406 a scattering panel beside a section of rail track.

The scattering panel of FIG. 4b is a scattering panel 4, 18, 20, 22, 100, 300 according to FIG. 1 or FIGS. 2a-2d, for example. The rail track 8, 14 and antenna 2, 24 may already be in situ, and to assemble the telecommunications system, the scattering panel 4, 18, 20, 22, 100 has to be put in place. This method of assembly allows the retrofitting of existing rail track 8, 14 to include the new telecommunications system, as shown in FIG. 1.

Figure 5A:
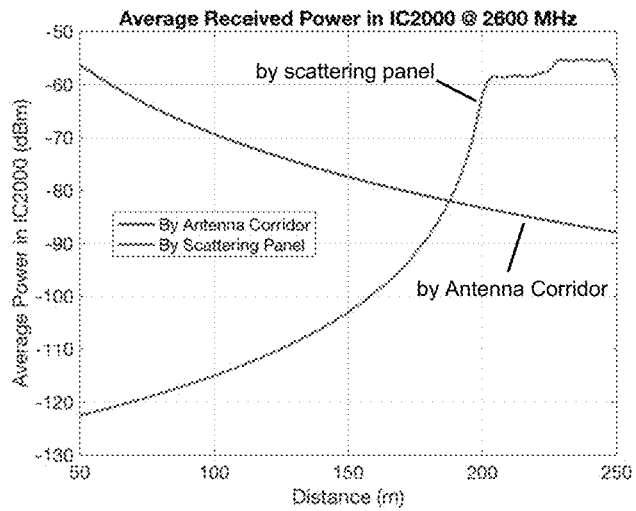
FIG. 5a illustrates a graph illustrating the average power received inside a train from a signal with a frequency of 2600 MHz using an example telecommunications system for directing signals into a train, in accordance with the present disclosure.

FIG. 5a illustrates a graph illustrating the average power received inside a train from a signal with a frequency of 2600 MHz using an example telecommunications system for directing signals into a train, in accordance with the present disclosure. In this regard, shown in FIG. 5a is an example power graph associated with an example use scenario (or simulation thereof) in an example telecommunications system for directing signals (e.g., electromagnetic signals) into a train. Specifically, shown in FIG. 5a is an example of the average power received in dBm inside a train 26 directly from an antenna 2, and by scattering from a scattering panel 4, 18. In this regard, the power graph illustrated in FIG. 5a may correspond to a particular train (or class of trains)—that is, trains meeting particular criteria or characteristics, such as train's manufacturer, train's operator, particular parts or equipment used on the train, etc. For example, the power graph illustrated in FIG. 5a may correspond to a use scenario simulation associated with a train modelled after the Swiss Federal Railway (SBB) IC2000 train, using windows made by Flachglass corporation (hereafter "Flachglass windows.")

In the illustrated power graph, as shown in FIG. 5a, the axes are average power received, and the distance from the train to the antenna 2. In this example the power transmitted was 25 dBm by the antenna 2, and there is a 25 m gap between each of the scattering panels, that is the scattering panels are placed at 225 m and 250 m distance from the antenna 2. The first scattering panel 4 is of a smaller size than the second scattering panel 18 such that the second scattering panel 18 may be less covered by the radio shadow of the first scattering panel 4.

The transverse distance between the scattering panel 4, 18 and rail track 8 may be a particular distance—e.g., 2 m. The frequency of the signal transmitted by the antenna 2 may be, for example, 2600 MHz. As noted above, the power graph (and data corresponding thereto) is based on an example use scenario simulation associated with SBB-IC2000 train utilizing Flachglass windows, with the power readings taken on the upper deck of the carriage. Nonetheless, the disclosure is not so limited, and other configurations of antenna(s) and scattering panel(s) may be used.

For example, antennas may be positioned a distance of for example 500 m or more from the scattering panels. Two antennas may be installed face to face. There may be two scattering panels installed back to back (or one symmetrical scattering panel). For example, a large scattering panel may be positioned equidistant to two antennas, with two smaller scattering panels positioned 15 meters to 50 meters away on either side toward each of the antennas, for example as shown in FIG. 6 which is described in more detail below. Such a configuration may be configured to avoid significant shadowing.

As shown in FIG. 5a, at a distance of 50 m from the antenna 2 the average power received from the reflected electromagnetic radio waves from the scattering panels 4, 18 is −120 dBm. This increases approximately exponentially to −60 dBm at 200 m from the antenna 2. At this point the average power received plateaus at between −50 dBm and −60 dBm until a distance of 250 m from the antenna 2. By contrast the average power received directly from the antenna 2 starts at −60 dBm at 50 m from the antenna 2 and decreases approximately exponentially to a point of −90 dBm 250 m from the antenna 2. This shows that, from a distance of above 170 m from the antenna 2, the scattering panels 4, 18 deliver more power to the train 26 at this frequency.

Figure 5B:
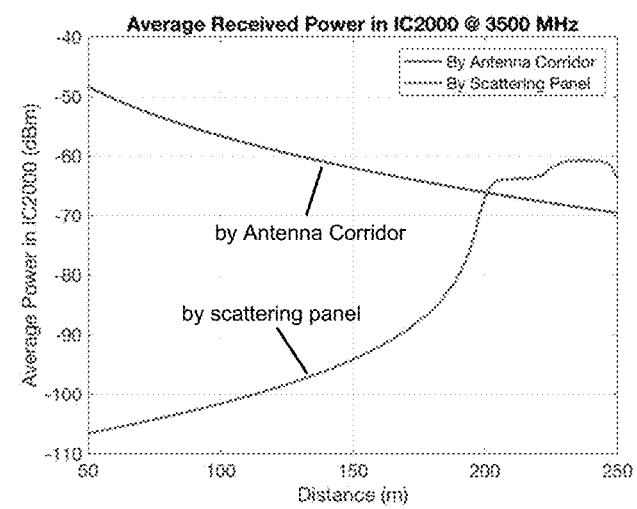
FIG. 5b illustrates a graph illustrating the average power received inside a train from a signal with a frequency of 3500 MHz using an example telecommunications system for directing signals into a train, in accordance with the present disclosure.

FIG. 5b illustrates a graph illustrating the average power received inside a train from a signal with a frequency of 3500 MHz using an example telecommunications system for directing signals into a train, in accordance with the present disclosure. In this regard, shown in FIG. 5b is an example power graph associated with an example use scenario (or simulation thereof) in an example telecommunications system for directing signals (e.g., electromagnetic signals) into a train. Specifically, shown in FIG. 5b is an example of the average power for signals (e.g., electromagnetic signals) received in dBm inside a train 26 directly from an antenna 2, and by scattering from a scattering panel 4, 18.

The axes are average power received, and the distance from the antenna 2 in both the antenna corridor and scattering panel solutions. In this example the power transmitted was 25 dBm, and there is a 25 m gap between each of the scattering panels 4, 18 (there are only two scattering panels at distances 225 m, and 250 m from the antenna 2). The first scattering panel 4 is of a smaller size than the second scattering panel 18 such that the second scattering panel 18 may be less covered by the radio shadow of the first scattering panel 4.

For example, in the case where the scattering panel of FIG. 2 is used, the radius of the semi-circular cross section may be smaller for scattering panel 4 than scattering panel 18. The transverse distance between the scattering panels 4, 18 and rail track is 2 m. The frequency of the signal transmitted by the antenna 2 is 3500 MHz.

As with the power graph in FIG. 5a, the power graph (and data corresponding thereto) illustrated in FIG. 5b is also based on an example use scenario simulation associated with SBB-IC2000 train utilizing Flachglass windows. Thus, FIG. 5b is substantially similar to FIG. 5a but illustrates exemplary power vs. distance curves for a transmit frequency of 3500 MHz (instead of 2600 MHz).

As shown in FIG. 5b, at a distance of 50 m from the antenna 2 the average power received from the scattering panels 4, 18 is −107 dBm. This increases approximately exponentially to −62 dBm at 200 m from the antenna 2. At this point the average power received plateaus at between −65 dBm and −60 dBm until a distance of 250 m from the antenna 2 is achieved. By contrast the average power received directly from the antenna 2 starts at approximately −50 dBm at 50 m from the antenna 2 and decreases approximately exponentially to a point of −70 dBm until a distance of 250 m from the antenna 2 is achieved. This shows that from a distance of above 200 m from the antenna 2, the scattering panels 4, 18 deliver more power to the train 26 at this frequency than power that is delivered directly from the antenna 2.

Figure 5C:
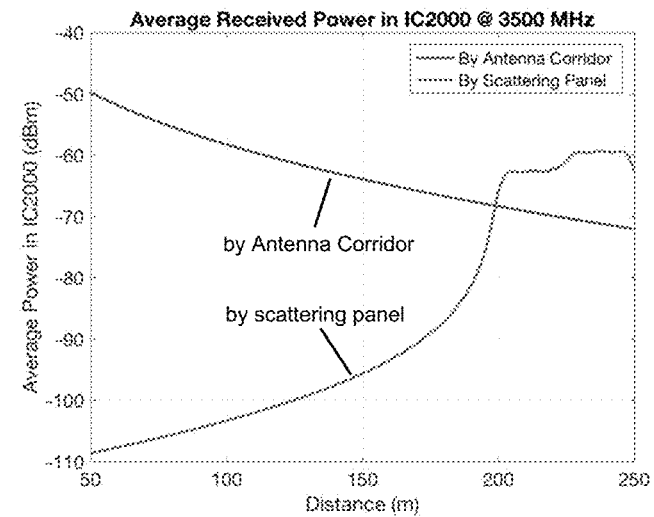
FIG. 5c illustrates the average power received when an example scattering panel is situated closer to a rail track, in accordance with the present disclosure.

FIG. 5c illustrates the average power received when an example scattering panel is situated closer to a rail track, in accordance with the present disclosure. In this regard, shown in FIG. 5c is an example of the average power received in dBm inside a train 26 directly from an antenna 2, 24, and that received by use of scattering from scattering panels 4, 18, 20, 22. The axes are average power received and the distance from the antenna 2, 24, in both the antenna corridor and scattering panel solutions.

In the example use scenario shown in FIG. 5c, the power transmitted is 25 dBm, and there is a 25 m gap between each of the scattering panels 4, 18 (there are only two scattering panels at distances 225 m, and 250 m from the antenna). The first scattering panel 4 is of a smaller size than the second scattering panel 18 such that the second scattering panel 18 may be less covered by the radio shadow of the first scattering panel 4. The transverse distance between the scattering panels 4, 18 and rail track 8, 14 is 1.5 m. The frequency of the signal transmitted by the antenna 2 is 3500 MHz.

As with the power graph in FIGS. 5a and 5b, the power graph (and data corresponding thereto) illustrated in FIG. 5c is also based on an example use scenario simulation associated with SBB-IC2000 train utilizing Flachglass windows. Thus, FIG. 5c is substantially similar to FIG. 5b but illustrates exemplary power vs. distance curves for a transverse distance between the scattering panels 4, 18 and the rail tracks 8, 14 of 1.5 m (instead of 2 m).

FIG. 5c shows that at a distance of 50 m from the antenna 2, the average power received from the scattering panels 4, 18 is −109 dBm. This increases approximately exponentially to −62 dBm at 200 m from the antenna 2. At this point the average power received plateaus at between −62 dBm and −60 dBm until a distance of 250 m from the antenna 2. By contrast the average power received directly from the antenna 2 starts at −50 dBm at 50 m from the antenna 2 and decreases approximately exponentially to a point of −71 dBm 250 m from the antenna 2.

This shows that from a distance of above 200 m from the antenna 2 the scattering panels 4, 18 deliver more power to the train 26 at this frequency. Compared with FIG. 5b the reduced distance between the track 8, 14 and the scattering panel 4, 18 has the effect that there is a greater difference between the average power received directly from the antenna 2, and from that received from the scattering panels 4, 18, and, comparatively above 200 m, the scattering panels 4, 18 direct more power into the train 26.

While the above simulations and measurements were carried out under specific conditions (e.g., with a specific train carriage, glass type, and distances), the results are generally applicable to rail track and train systems in general. Therefore to compensate for the loss of power at distances of more than 100 m from an antenna 2 the scattered wireless signals 12 from the scattering panels 4, 18 may also help increase power received inside the train 26 for other rail tracks and train systems.

For example, as noted above, these simulations are based on use scenarios associated trains utilizing Flachglass windows. This type of glass may only allow one polarization mode of the wireless signals to pass through it, however, whereas other glass types may allow multiple polarization types through them.

FIG. 6 illustrates another example of a telecommunications system for directing signals into a train, in accordance with the present disclosure. In this regard, shown in FIG. 6 is another example of a telecommunications system for directing signals (e.g., electromagnetic signals) into a train. Two tracks 8, 14 along which trains can travel are arranged parallel to one another. Two communication antennas 2, 3 are disposed on a first side of the tracks 8, 14, and two further communication antennas 24, 25 are disposed on the other side of the tracks 8, 14.

The system also comprises a larger scattering panel 32 and two smaller scattering panels 34, 36 disposed on the first side of the two tracks 8, 14, and a larger scattering panel 42 and two smaller scattering panels 44, 46 disposed on the other side of the tracks 8, 14. The scattering panels 32, 34, 36, 42, 44, 46 and the antennas 2, 24 are situated beside the rail tracks, and spaced from the rail tracks, for example by a distance of between about 0.5 meters and about 10 meters, or more specifically for example between 1 meter and 5 meters, for example between 2 meters and 4 meters, for example between 1 meter and 3 meters, or for example between 3 meters and 6 meters.

The larger scattering panel 32 on the first side of the tracks 8, 14 is disposed equidistantly between the antennas 2, 3 and the larger scattering panel 42 is disposed equidistantly between the antennas 24, 25 on the other side of the track. The smaller scattering panels 34, 36, 44, 46 are disposed an equal distance d away from the larger scattering panels 32, 42 that are disposed on their respective side of the tracks 8, 14.

The scattering panels 32, 34, 36, 42, 44, 46 each comprise an electrically conductive surface which is positioned to direct at least a part of an incident wireless signal towards the tracks 8, 14. For example, each of the scattering panels 32, 34, 36, 42, 44, 46 may be arranged as described herein with reference to any of FIGS. 2a-d, 3a-c and 8a-d. The scattering panels may be configured and/or positioned such that the larger scattering panels 32, 42 also direct wireless signals towards the smaller scattering panels 34, 36, 44, 46, which subsequently direct the signals towards the tracks 8, 14.

The distance d between the larger scattering panels 32, 42 and their respective smaller scattering panels 34, 36, 44, 46 may be from between 15 m to 50 m. Such an arrangement may enable significant shadowing to be avoided.

With reference to FIG. 1 and FIG. 2, a range of variations may be provided, and further refinements and advantages of the system described above may be provided.

For example, the corrugations 112 on the back side 110 of the scattering panels 100 described herein are optional, or the back side 110 may be partially or fully covered by corrugations 112. The laminar structure 106 may be configured to reflect electromagnetic radiation onto the first surface 102 to increase the amount of radiation that is directed towards the rail track 8, 14 by the scattering panel 100. For example, when the scattering panel 100 is installed beside the rail tracks 8, 14 the laminar structure 106 may be parallel with the rail tracks 8, 14 and point towards the antenna 2 with its flat surface facing the tracks 8, 14. The laminar structure is an optional feature of the scattering panel.

For example, with reference to FIG. 1 the antennas 2, 24 are situated on opposite sides of the lengths of rail track 8, 14. A first antenna 2 is situated beside the first length of rail track 8 and a second antenna 24 is situated beside the second length of rail track 14.

FIG. 1 shows a train 26 is situated on the first length of rail track 8 adjacent one of the first scattering panels 4. The antennas 2, 24 are configured to produce wireless signals 6, 16. The first antenna 2 situated beside the first length of rail track 8 may produce wireless signal 6, such that wireless signal 6 travels approximately parallel to the first length of rail track 8 until wireless signal 6 reaches scattering panel 4. Scattering panel 4 scatters the wireless signal 6 such that wireless signal 12 is directed to be incident the side of the train 26.

The second antenna 24 beside the second rail track 14 produces a second lobe 16 illustrating a wireless signal, but this is directed directly at the train 26, rather than towards the scattering panel 22. Two independent signals may then be provided for a train 26, and this may allow a MIMO (multiple input multiple output) system.

The system of claim 1 may include any of the scattering panels 100, 300 of FIGS. 2 and 3, for example. The system of FIG. 1 may produce the transmission results of FIG. 5, for example. Additionally the system of FIG. 1 may be used according to the method shown in FIG. 4a, and may be assembled according to the method of FIG. 4b, for example. Optional features referenced below may be incorporated into the system of FIG. 1.

The antennas 2, 24 of FIG. 1 may be communications antennas configured to produce a wireless signal 6, 16. The antennas 2, 24 may be dipole antennas, loop antennas, helical antennas, array antennas, or any other type of antennas configured to produce a wireless signal. The antennas 2, 24 may also be configured to receive a wireless signal. In some instances this will enable two-way communication between an antenna 2, 24 and another device, such that the antenna 2, 24 produces a wireless signal 6, 16 which is received by the other device, and the other device then produces a signal that is received by the antenna 2, 24. The other device may be situated on the train 26.

The scattering panels 4, 18, 20, 22 do not have to be provided in pairs, but rather a single scattering panel 4 may be provided in some examples. A scattering panel 4, 18, 20, 22 may be provided on each side of the lengths of rail track 8, 14, but these may be offset from one another in the direction in which the rail track 8, 14 extends, as well as in the direction perpendicular to the direction in which the rail track 8, 14 extends, such that the scattering panels 4, 18, 20, 22 are staggered.

The number of sections of rail track 8, 14 is merely illustrative, and any other number of tracks may be present. The track 8, 14 is optional, and the system may be provided as a kit comprising the antenna 2, 24 for installation at trackside. If rail track 8, 14 is present, it may be electrified or not. The rail track 8, 14 may be used in an underground railway, an overground railway, an elevated railway or any other type of railway. The rail track 8, 14 may not necessarily consist of a physical track, but may be a space through which the train may travel, for example in the case of magnetic levitation ("maglev") trains the track comprises the passageway that the train levitates above. The system may also be used on other public transport systems, such as trams or buses.

FIG. 1 shows that the scattering panels 4, 18, 20, 22 may be situated on masts 10. The scattering panels 4, 18, 20, 22 may be free standing. If the scattering panels 4, 18, 20, 22 are attached to masts 10, the masts 10 may be catenary masts used in providing electricity to power the electric trains. Further the antennas 2, 24 are also shown as attached to mast 10, but these too may be free standing. Attaching the scattering panels 4, 18, 20, 22 to masts 10, or disposing scattering panels 4, 18, 20, 22 in a free standing position allows the system shown in FIG. 1 to be retrofitted to existing rail track 8, 14.

FIG. 1 shows the train 26 on the rail track 8, 14. However, since the purpose of the train is to travel along the rail track 8, 14, will not always be a train 26 on the length of rail track 8, 14, and the wireless signal 12 may instead be directed across the rail track 8, 14 in this case.

FIG. 1 shows the wireless signals 6 and 12 as being separate. However, this is merely for the illustrative purposes. The wireless signal 6 is produced by the antenna 2. This is directed by scattering panel 4. The scattered wireless signal is shown as signal 12.

The second antenna 24 beside the second length of rail track 14 is shown as directing the wireless signal 16 it produces directly into the train 26. In some examples this is the case, and in others both antennas 2, 24 on either side of the track may also make use of the scattering panels 4, 18, 20, 22. There may only be one antenna 2, 24 on one side of the rail track 8, 14. There is a larger angle between the second antenna 24 and the train 26 than between the first antenna 2 and the train 26. The transmission rate of wireless signals 6, 16 into the train varies with the angle of incidence to the train 26.

Angles that are closer to perpendicular to the side of the train 26 (and thus typically to the window glass panes) have a higher transmission rate. Therefore the transmission rate into the train 26 may be higher from the second antenna 24 as compared to the first antenna 2. Therefore, the scattering panel 22 may not be required for the wireless signal 16 produced by the second antenna 24, but could optionally be used if desired (e.g., if the gauge of rail track 8, 14 is narrow).

However, in the case where two trains 26 are side by side on the two lengths of rail track 8, 14 both the first scattering panel 4 and the second scattering panel 22 may be used by the first and second antennas 2, 24 respectively. It is also noted that the scattering panels 4, 18, 20, 22 may be arranged such that the scattering panels 4, 18, 20, 22 scatter the wireless signal in a desired direction. A desired direction may not be perpendicular, but may be another direction. For example if there are environmental obstacles that mean that a desired direction is a direction other than transverse to the lengths of rail track 8, 14.

The antenna, or antennas 2, 24 of the system described herein, (e.g., with reference to FIG. 1) may form part of an antenna corridor. An antenna corridor may comprise a series of antennas 2, 24 disposed in a line which runs parallel with a rail track 8, 14. A scattering panel, or panels 4, 8, 20, 22, may be used in conjunction with the antenna corridor. The use of the scattering panels 4, 18, 20, 22 may reduce the number of antennas 2, 24 required, or increase the minimum distance between each of the antennas 2, 24.

It is also noted that in some exemplary configurations the scattering panel 4 may form an electromagnetic shadow on scattering panel 18 when antenna 2 is in use (that is the wireless signals from antenna 2 may not reach scattering panel 18, or may be significantly attenuated, as scattering panel 4 may be in the line-of-sight wireless signals path). However, in some exemplary configurations further antennas may be used, and the antennas may be in a back-to-back configuration such that scattering panel 18 is illuminated from the opposite direction. In exemplary configurations such as this, the scattering panels 4, 18 may be positioned close to one another, or even on the same mast 10 or on a catenary mast.

The embodiments shown in the Figures are merely exemplary, and include features which may be generalised, removed or replaced as described herein and as set out in the claims. With reference to the drawings in general, the schematic functional block diagrams are used to indicate functionality of systems and apparatus described herein. The structure and functionality need not be divided as shown in the Figures. The function of one or more of the elements shown in the drawings may be further subdivided, and/or distributed throughout apparatus of the disclosure. In some embodiments the function of one or more elements shown in the drawings may be integrated into a single functional unit.

In some examples, the distances between the scattering panels 4 and 18 may be dependent on the type of the window panes and the frequency of the operation and transverse distance between the beam of the antenna and the window panes, and the position of the antennas (whether they are right above the train carriage aligned with the track, or a bit offset). There may be any number of scattering panels between successive antennas situated along the rail track. However, due to the first scattering panel 4 being in the line of sight between the antenna and the second (or further panel) scattering panel 18, the scattering panel 18 may be in shadow of the first scattering panel. Therefore, dependent upon size of the first scattering panel 4, there may be 2 or more scattering panels between antenna 2 and the next antenna along the rail track. If multiple scattering panels 4, 18 are used they may be any distance away from one another, for example 12 meters to 30 meters, and specifically for example every 25 meters.

The scattering panels may incorporate cross sectional shapes and/or combinations thereof that are deemed advantageous for the intended operations of the scattering panels—particularly the scattering of signals for optimal directing onto the trains. For example, with regard to FIGS. 3a and 3b, the scattering panels shown therein incorporate such combinations of cross sectional shapes that are considered advantageous as: triangular plane cross section and linear concave cross section of first surface, semi-circular plane cross section and linear concave first surface cross section, right angled triangle plane cross section and linear concave first surface cross section, triangular plane cross section and curved concave first surface cross section, semi-circular plane cross section and curved concave first surface cross section, right angled triangle plane cross section and curved concave first surface cross section, triangular plane cross section and linear first surface cross section, semi-circular plane cross section and linear first surface cross section, right angled triangle plan cross section and linear first surface cross section, triangular plane cross section and convex first surface cross section, semi-circular plane cross section and convex first surface cross section and right angled triangle plane cross section and convex first surface cross section. Other combinations of cross sectional shapes may also be used, however.

In some embodiments, the radius of a scattering panel may be for example 0.5 meters to 1 meter.

Figure 7:
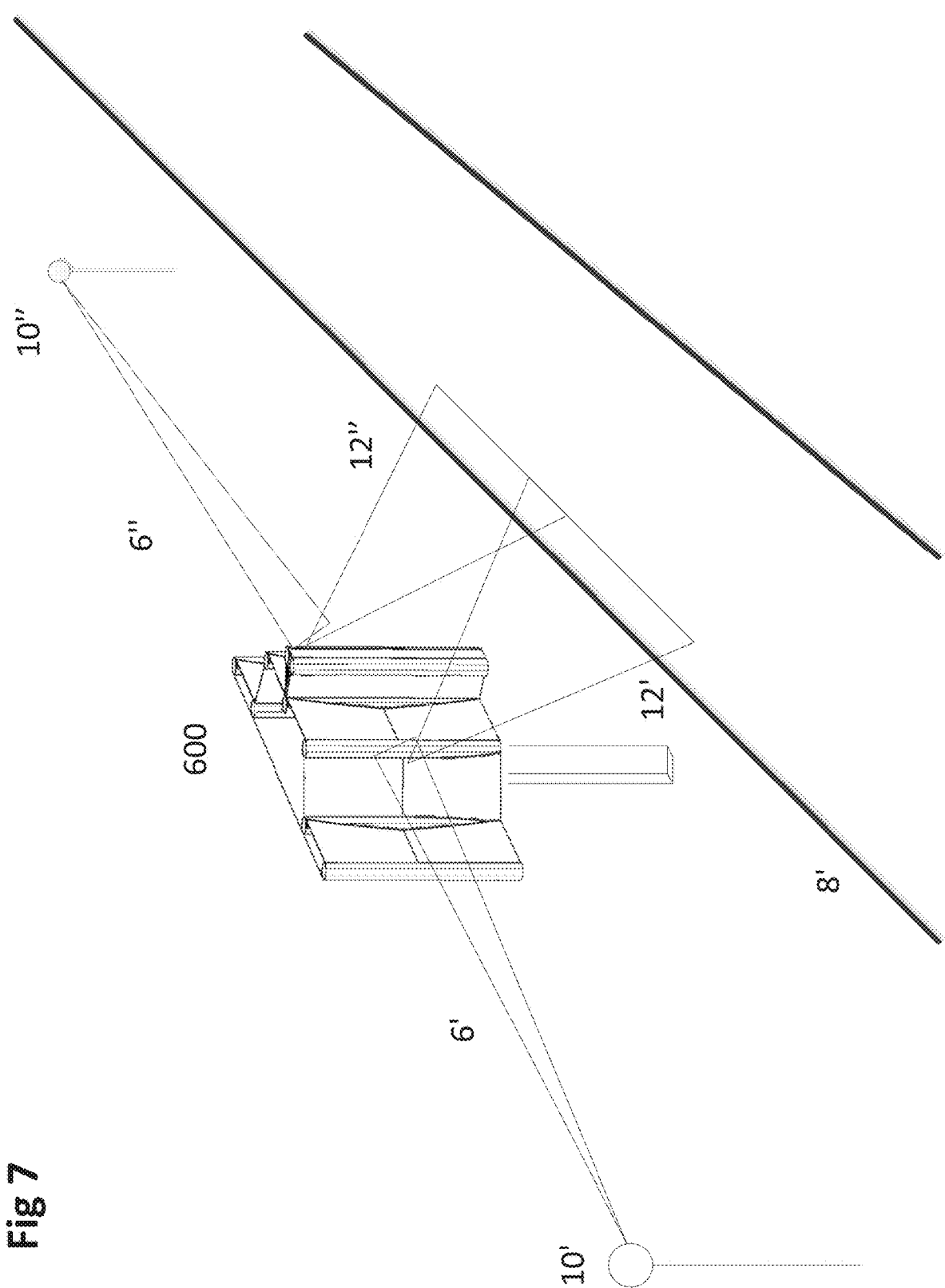
FIG. 7 illustrates another example of a telecommunications system for directing signals into a train, in accordance with the present disclosure.

FIG. 7 illustrates another example of a telecommunications system for directing signals into a train, in accordance with the present disclosure. In this regard, the system shown in FIG. 7 is similar to that described with reference to FIG. 1, other than in that it uses an alternative scattering panel 600 in place of the scattering panels previously described. As illustrated, the system of FIG. 7 comprises this alternative scattering panel 600 situated beside the rail track. The system also comprises communications antennas 10', 10", which may also be situated beside the rail track 8'.

The panel 600 comprises a plurality of facets for redirecting incident wireless radio signals 6', 6" from antennas 10', 10". These antennas 10', 10" may be positioned on either side of the panel 600, and spaced along the track from the panel 600. The panel 600 may thus be arranged to reflect signals from both antennas. Signals arriving at the panel 600 from the antennas 10', 10" may travel in the direction along the rail tracks, and may be scattered by the panel to a direction approximately transverse to the direction of the tracks e.g., towards a train track 8' adjacent to the panel 600.

As will be described in more detail below, the panel 600 is multifaceted, and the facets of the panel 600 are arranged into a series of reflectors, each of which is concave and which can direct the signals towards the adjacent track 8'. These reflectors face in a variety of different directions (they are not mutually aligned) so that they spread the incident radio signals 6', 6" along a length of the track. The panel also spreads the signals 6', 6" vertically. The panel 600 thereby increases the angular width of the scattered signals 12', 12" as compared to the incident signals 6', 6".

FIGS. 8a-8d illustrate an example scattering panel for use in the example telecommunications system shown in FIG. 7. In this regard, the scattering panel 600 is shown in more detail in FIGS. 8a-8d. The panel 600 comprises a hollow trapezoidal prism having a base 608, a front face 630, 640, and two side faces 620, 650 which connect the base 608 to the front face 630, 640. Each of the side faces is concave and reflective (these side faces are also referred to herein as concave reflectors 620, 650). The side faces 620, 650 of the trapezoidal prism are each connected to the base 608. Each side face is also connected to the front face 630, 640.

The front face 630, 640 of the trapezoidal prism comprises two further concave reflectors. One reflector 630 provides one half of the front face, and the other reflector 640 provides the other half of the front face. An inverted hollow triangular prism 605 is connected along one of its apex edges 635 to the center of the front face 630, 640 of the trapezoidal prism, along the boundary between these two reflectors 630, 640.

Two plate-like fins extend from and parallel to the base 608 of the trapezoid prism, where each fin comprises a respective reflector 610, 660.

The panel 600 comprises a plurality of substantially rectangular flat sheets coupled together along their respective edges. The surface of each sheet provides a rectangular flat reflective facet for reflecting incident telecommunication signals in a certain direction. Each of the sheets may comprise an electrically conductive material such as those described elsewhere herein (e.g., a metallic material). In some examples, a reflective coating, for example a conductive coating such as a metallic coating, may be applied to each surface of each sheet. For example each sheet may be made of a non-reflective material, for example a plastic, and coated with a reflective coating.

Pairs of sheets are connected together along one of each of their respective edges to form a set of six reflectors 610, 620, 630, 640, 650, 660. A first reflector 610 comprises a top facet 611*a*, and a bottom facet 611*b* which are coupled to one another along an edge 602*a*. A second reflector 620 comprises a top facet 621*a*, and a bottom facet 621*b* which are coupled to one another along an edge 602*b*. A third reflector 630 comprises a top facet 631*a*, and a bottom facet 631*b* which are coupled to one another along an edge 602*c*. A fourth reflector 640 comprises a top facet 641*a*, and a bottom facet 641*b* which are coupled to one another along an edge 602*d*. A fifth reflector 650 comprises a top facet 651*a*, and a bottom facet 651*b* which are coupled to one another along an edge 602*e*. A sixth reflector 660 comprises a top facet 661*a*, and a bottom facet 661*b* which are coupled to one another along an edge 602*f*.

Each reflector thus comprises a pair of facets 611-661*a,b* coupled together along an edge 602*a-f*. Each of the facets in each pair extends from the edge 602*a-f* of their respective reflector such that the angle between each sheet is less than 180 degrees, (but greater than 90 degrees). As such, each of the reflectors is concave.

As is best shown in FIG. 8*c*, the edges 602*a-f* connecting the top and bottom facets of all six reflectors are aligned with one another. The facets may be flat, and may be joined at discrete sharp intersections. However, they may also be curved, for example at their edges, to reduce discontinuities between adjacent facets. If facets are curved at their edges a central region of each facet may be flat.

The first reflector 610 is coupled to the second reflector 620 along an edge that is perpendicular to the direction of the edges 602*a*, 602*b* that connects the pairs of facets of the first and second reflectors 610, 620. The first facets 611*a*, 621*a* of the first 610 and second 620 reflectors, and the second facets are connected to one another at an angle greater than 90 degrees apart, for example greater than 100 degrees, for example greater than 120 degrees, for example less than 150 degrees, and more specifically for example approximately 130 degrees shown as angle a1 in FIG. 8*b*. A first intersection 615 defines the boundary between the first reflector 610 and the second reflector 620. The first intersection 615 connecting the reflectors is provided by a curved surface, for example it may be provided by a portion of the surface of a cylindrical element (as shown). In other examples the intersections between adjacent reflectors may be sharp, for example each facet of the first reflector 610 may connect directly to a corresponding adjacent face of the second reflector 620.

The second reflector 620 is connected to a third reflector 630 along an edge opposing the edge connected to the first reflector 610 to define a second intersection 625. The facets of the second and third reflectors are connected to one another such that their outer faces are at an angle to each other, for example greater than 180 degrees apart, for example greater than 200 degrees apart, for example less than 250 degrees apart, and more specifically for example approximately 230 degrees apart. As such the second intersection 625 is provided as a ridge between the second 620 and third 630 reflectors. Both facets of the third reflector extend from the second intersection 625 in a direction that is opposite and parallel to the direction that corresponding facets of the first reflector extend from the first intersection 615. In FIG. 8*b*, the outer edges of the first reflector 610 and the third reflector 630 may be parallel, and extend in opposite directions from opposite edges of the second reflector 620.

An additional reflector provided by the inverted hollow triangular prism 605 is connected to the third reflector 630 along the edge of the third reflector 630 edge opposite the edge connected to the second reflector 620. The additional reflector 605 comprises three reflective sheets coupled together to provide a hollow substantially inverted triangular prism shape. The connected edge of the additional reflector 605 extends along the full width of the center of front face of the trapezoidal prism, such that the third reflector 630 lies on one side of it, and a fourth reflector 640 lies on the other side. The additional reflector 605 comprises a pair of angled faces 612, 613 arranged to reflect radio frequency signals towards the third 630 and fourth 640 reflectors respectively.

As shown in FIG. 8*b*, the panel 600 is symmetrical along the length of the additional reflector 605. In particular the panel 600 is symmetrical about the plane S perpendicular to the outer edges of the facets of the first and third reflectors 610, 630 and perpendicular to the edges 602*a-f* connecting the pairs of sheets of each reflector. As such, fourth 640, fifth 650 and sixth 660 reflectors are arranged as mirror images of the third 630, second 620 and first 610 reflectors respectively. The fourth 640, fifth 650 and sixth 660 reflectors are arranged and connected to one another as described above with reference to the first 610, second 620 and third 630 reflectors, for example.

With reference again to FIG. 7, the scattering panel 600 may be installed along a train track 8'. In operation, radio frequency signals incident on the panel 600 from opposite and parallel first and second directions 6', 6" are reflected by the panel 600 into direction(s) approximately transverse to the first and second directions. For example, signals incident on the second and fifth reflectors 620 650 may be reflected in a transverse direction, away from the panel 600, towards a train track. Signals incident on the angled faces 612, 613 of the additional reflector 605 from the first and second directions are reflected onto the third and fourth reflectors 630, 640, respectively. These signals are then reflected away from the panel 600, for example towards the track.

The first, third, fourth and sixth reflectors 610, 630, 640, 660 are arranged approximately parallel to the direction of the track. As such they may be configured to reflect signals from the direction of the track (e.g., that have been reflected by a train on the track) back towards the track. For example, the scattering panel 600 may be positioned such that a train on the track is within the near field of the panel 600, for example the panel may be positioned at a distance approximately 1.5 to 5 meters from the track 8', for example the distance between the base 608 of the panel 600 and the track 8' may be approximately 1.5 to 5 meters. In operation, a radio signal may reflect off the third reflector 630 towards the track, and then reflect back towards the panel 600 off the body of a train passing on the track. The signal may then be reflected again off the first reflector 610 or third reflector 630 back towards the passing train where it may be successfully received inside the train, for example via a window pane of the train.

The concave nature of the reflector 610-660 the vertical particular direction may act to focus a signal beam in that is reflected off their surfaces, such that the vertical width of the reflected beam is narrower than the incident beam.

The arrangement of reflectors 610, 620, 630, 640, 650, 660 described herein provides a plurality of reflective facets facing in a range of different directions. As such, a signal beam incident on the panel 600 is reflected across a wide range of angles. This acts to increase the signal coverage along the direction of the incident beam upon reflection. For example the reflected signal beam can be focused along a length of an adjacent track 8'.

In the example panel 600 shown in the figures, the reflectors 610, 620, 630, 640, 650, 660 are connected to one another via the curved surfaces of cylindrical elements. However, it should be understood that in other examples the reflectors may be connected via curved sheet-like elements, or in other examples the facets of one reflector may be directly connected to a corresponding facet of an adjacent reflector.

In some examples the additional reflector 605 may be absent from the panel. In some examples the first 610 and/or sixth 660 reflector may be absent. In some examples the panel 600 may not be symmetrical. For example the panel 600 may only reflect signals from a first direction towards the track 8', and not from a second opposite direction. Some example panels may only comprise a first 610 second 620 and third 630 reflector as described herein. The exact angle between each of the sheet like members of the panel may vary in different example panels.

The panel 600 is shown as a hollow shape comprising several connected sheet-like members. However, the panel may be formed from a single sheet of reflective material, and shaped substantially as described herein. For example the panel may be cast into the shape described. In other examples the panel 600 may be formed from a solid block of reflective material, with facets as described herein formed on it.

In other examples the panel 600 may be formed from a grill or mesh-type material. For example, the panel may be formed from one or more reflective sheets with a plurality holes punched through them. This may provide the advantage of the panel being less susceptible to inclement weather conditions, such as wind—that is, with punched out structures to make the whole thing less susceptible to forces applied by winds.

The angles between the various facets, reflectors and sheets of the panel 600 described herein are merely exemplary, and panels with different angles between the various surfaces described are contemplated. For example the angle between reflectors and/or reflective sheets of the reflectors may be adjusted depending on the frequency of the incident signals, on the height of the antenna 10', 10" and distance between the panel and the rail track 8', for example to maximize the effectiveness of the panel 600.

In some examples the first reflector 610 and the third reflector 630 are arranged such that their outer edges are at an angle other than parallel to one another, for example they may be arranged such that the angle between their outer edges is approximately 5 degrees.

Some example panels comprise additional reflective sheets in comparison to the panels described herein, the surface of which may provide additional facets for reflecting signals incident on the panel.

In some examples, the panel 600 may be positioned within a radome, or radome like structure, for example when in use beside a railway track. This may protect the panel from snow or wind and may make the panel easier to clean.

In some examples the panel 600 may be assembled from two smaller panels connected together, for example two similar or identical smaller panels. For example a first panel may comprise the third 630, second 620 and first 610 reflectors and may be connected to a second panel comprising the fourth 640, fifth 650 and sixth 660 reflectors, to form a scattering panel such as the scattering panel 600 described herein.

The term scattering relates generally to the redirecting of signals. For example the panel or each facet of the panel may scatter radio signals by reflecting them. Such reflection may comprise specular reflection, and/or diffuse reflection. The surface of the panels may have surface features such as a smoothness/roughness selected to provide such types of scattering and reflection.

Accordingly, an example wireless communications system in accordance with the present disclosure may comprise a communications antenna, situated beside a rail track, for sending and receiving wireless signals, and a scattering panel situated beside the rail track and spaced apart along the rail track from the communications antenna and configured to direct the wireless signals from or to the communications antenna into or from a train on the length of rail track. The scattering panel may be attached to a mast, such as a catenary mast.

The scattering panel may comprise a first surface and the first surface may be electrically conductive. The scattering panel may be positioned relative to the communications antenna so that wireless signals incident on the first surface from the communications antenna are reflected towards the tracks. The communications antenna may be one of a series of antennas disposed in a line adjacent the rail track, for example as part of an antenna corridor.

A vertical profile of the first surface may be concave. For example, the concavity of the first surface and its height relative to the antenna may be selected to direct wireless signals incident on the first surface from the antenna towards the tracks at a selected height. The selected height may correspond to the height above the track of a window of a passenger compartment of a train.

The scattering panel may comprise a second surface which faces away from the communications antenna. The second surface may carry corrugations. The first surface and second surface may be curved so that the plan cross section of the panel is part circular. The scattering panel may comprise a semi-circular prism or cone. The scattering panel may comprise a back side which carries corrugations.

The antenna may be spaced from the rail track by at least 1.5 meters, for example less than 10 meters, and the scattering panel may be at the same distance from the track or closer.

An example scattering panel for redirecting telecommunications signals in accordance with the present disclosure may comprise a first surface and a second surface. The first surface presents a cross section to signals (e.g., electromagnetic signals) incident on the panel from a first direction and is shaped for redirecting the signals predominantly in a second direction, transverse to the first direction. The second surface is on a side of the scattering panel that is sheltered from the electromagnetic signals by the first surface. The first surface and the second surface are electrically conductive and the second surface comprises corrugations for reducing the magnitude of electromagnetic signals propagating over the second surface transverse to the direction of the corrugations.

The vertical profile of the first surface may be concave. The first surface may be concave by an angle of less than 5 degrees. The plan cross section of the panel may be part circular, and the first surface and the second surface may be disposed on adjacent sectors of a curved face of the scattering panel. The scattering panel may comprise a flat back side, for example the flat back side may carry corrugations. The corrugations of the second surface may be orientated vertically.

An example method of installing a scattering panel beside a rail track in accordance with the present disclosure may comprise disposing a scattering panel beside a section of rail track spaced apart along the track from a telecommunications antenna, and selecting a position of the scattering panel so that RF electromagnetic signals incident on a first surface of the panel from the antenna are directed across the track. Selecting the position of the scattering panel may comprise selecting the height based on the height of the antenna, and a vertical profile of the first surface, for example where selecting the position of the scattering panel comprises selecting its orientation.

An example antenna corridor in accordance with the present disclosure may comprise a series of antennas disposed in a line which runs parallel with a length of rail track, and at least one scattering panel. The antennas are configured to emit wireless signals at least partially in a direction parallel to the rail track, and the scattering panel is configured to at least partially deflect a portion of the wireless signal across the rail track.

An example telecommunication method for providing a telecommunication service in a train in accordance with the present disclosure may comprise directing a wireless telecommunications signal alongside a rail track and onto a scattering panel such as that of any of those disclosed herein, where the scattering panel is disposed adjacent the rail track to redirect the wireless telecommunications signal across the rail tracks for providing telecommunications in the train.

An example telecommunication method for providing a telecommunication service in a train using any of the systems described above, in accordance with the present disclosure, may comprise directing a wireless telecommunications signal from the communications antenna onto the scattering panel thereby to redirect the wireless telecommunications signal across the rail tracks for providing telecommunications in the train.

The embodiments described above are merely illustrative. As such, other embodiments are contemplated. Further, any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present disclosure may be realized in hardware, software, or a combination of hardware and software. The present disclosure may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure makes reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present disclosure not be limited to the particular embodiment disclosed, but that the present disclosure will include all embodiments falling within the scope of the appended claims.

What is claimed is:

1. A scattering panel configured for redirecting signals in a train system, the scattering panel comprising:
   a plurality of facets, wherein:
      each facet of the plurality of facets faces in a different direction to at least one other facet of the plurality of facets;
      each facet comprises a conductive planar surface of one of a plurality of sheet-like members of the scattering panel;
      members of the plurality of sheet-like members are coupled to one another along their edges such that facets of the plurality of facets together combine to provide a plurality of adjacent concave reflectors;
      at least one facet of the plurality of facets comprises one or more flat planar surfaces and at least one other facet of the plurality of facets comprises a curved surface portion; and at least one facet of the plurality of facets comprises shaped structures that are disposed on a surface of the at least one facet, wherein the shaped structures are configured for modifying one or more parameters relating to signals propagating over the surface in at least one direction relative to the surface.

2. The scattering panel of claim 1, wherein the plurality of adjacent concave reflectors comprises a first concave reflector and a second concave reflector; and
wherein the first concave reflector is connected to the second concave reflector along a first intersection, along which facets of the first concave reflector and facets of the second concave reflector meet at an angle greater than 90 degrees.

3. The scattering panel of claim 2, wherein the second concave reflector is connected to a third concave reflector along a second intersection along which facets of the second concave reflector and facets of the third concave reflector meet at an angle greater than 180 degrees.

4. The scattering panel of claim 3, wherein the first concave reflector is connected to an opposite edge of the second concave reflector from the third concave reflector.

5. The scattering panel of claim 3, wherein the facets of the first concave reflector that are adjacent to the first intersection extend from the first intersection in a direction that is opposite and parallel to corresponding facets of the third concave reflector adjacent to the second intersection.

6. The scattering panel of claim 3, further comprising a fourth concave reflector coupled to the third concave reflector, the fourth concave reflector comprising a first face configured to reflect signals towards the third concave reflector.

7. The scattering panel of claim 6, wherein the fourth concave reflector is shaped as an inverted triangular prism.

8. The scattering panel of claim 6, comprising a plane of symmetry along the length of the fourth concave reflector.

9. The scattering panel of claim 3, wherein at least one of the first and second intersections comprise a curved surface.

10. The scattering panel of claim 1, wherein each concave reflector from the plurality of adjacent concave reflectors comprises two facets provided by two sheet-like elements connected to one another along an edge perpendicular to at least one intersection between the concave reflector and at least one other concave reflector from the plurality of adjacent concave reflectors.

11. The scattering panel of claim 10, wherein the two sheet-like elements of each concave reflector are connected to one another at an angle less than 180 degrees.

12. The scattering panel of claim 1, wherein the scattering panel is configured to reflect signals received from a first direction into a second direction transverse to the first direction.

13. The scattering panel of claim 12, wherein the scattering panel is configured to reflect signals received from a third direction parallel to the first direction, into a fourth direction transverse to the third direction.

14. A scattering panel comprising:
a trapezoidal prism comprising a base, a front face and a pair of side faces, wherein each side face connects an edge of the base to an edge of the front face;
a pair of plate-like fins comprising a front face and a back face, the fins extending from either side of, and parallel to, the base of the trapezoidal prism; and
an inverted triangular prism, wherein an apex edge of the triangular prism is connected along its length to the center of the front face of the trapezoidal prism to divide the front face into a first side and a second side;
wherein each of the first and second sides of the front face of the trapezoidal prism, the side faces of the trapezoidal prism, and the front face of the plate-like fins comprises electrically conductive facets for reflecting signals.

15. The scattering panel of claim 14, wherein each side of the front face of the trapezoidal prism, the side faces of the trapezoidal prism, and the front faces of the plate-like fins, comprises a pair of reflective facets.

16. The scattering panel of claim 15, wherein each pair of facets comprises a first facet connected to a second facet of the pair along an edge, at less than 180 degrees.

17. The scattering panel of claim 15, wherein the pair of reflective facets defines a concave reflector.

18. The scattering panel of claim 14, wherein each of the side faces of the trapezoidal prism is connected to the front face along an intersection, the intersection comprising a curved ridge.

19. The scattering panel of claim 14, wherein each of the side faces of the trapezoidal prism is connected to a corresponding one of the plate-like fins.

20. The scattering panel of claim 14, wherein the triangular prism comprises a first slanted face and a second slanted face, and wherein:
the first slanted face is configured to reflect signals towards the first side of the front face of the trapezoidal prism, and
the second slanted face is configured to reflect signals towards the second side of the front face of the trapezoidal prism.

21. The scattering panel of claim 14, wherein the inverted triangular prism and the trapezoidal prism are aligned such that the scattering panel comprises a plane of symmetry about the center of the inverted triangular prism and the trapezoidal prism.

* * * * *